(12) United States Patent
Okamoto et al.

(10) Patent No.: US 9,421,456 B2
(45) Date of Patent: Aug. 23, 2016

(54) STORAGE MEDIUM STORING A LOAD DETECTING PROGRAM AND LOAD DETECTING APPARATUS

(75) Inventors: Motoi Okamoto, Kyoto (JP); Shigehiro Kasamatsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2388 days.

(21) Appl. No.: 12/230,934

(22) Filed: Sep. 8, 2008

(65) Prior Publication Data

US 2009/0093305 A1 Apr. 9, 2009

(30) Foreign Application Priority Data

Oct. 9, 2007 (JP) ................. 2007-263804

(51) Int. Cl.
*A63F 13/00* (2014.01)
*G06F 17/00* (2006.01)
*A63F 13/20* (2014.01)
*A63F 13/40* (2014.01)

(52) U.S. Cl.
CPC ................ *A63F 13/06* (2013.01); *A63F 13/10* (2013.01); *A63F 2300/1043* (2013.01); *A63F 2300/1068* (2013.01); *A63F 2300/6045* (2013.01); *A63F 2300/69* (2013.01)

(58) Field of Classification Search
CPC . A63F 13/06; A63F 13/10; A63F 2300/1043; A63F 2300/1068; A63F 2300/6045; A63F 2300/69; G06F 19/00; G10G 1/04
USPC ............. 463/3, 16, 20, 35–37, 40; 273/138.1, 273/138.2, 139, 141 A, 141 R, 142 A, 142 B, 273/142 C, 142 H, 142 HA, 460–461; 345/475, 606; 472/15; 473/451–452; 482/1, 9, 54, 70, 78, 91, 121, 140; 725/38, 40, 133, 141, 153
See application file for complete search history.

(56) References Cited

U.S. PATENT DOCUMENTS

| | | |
|---|---|---|
| 588,172 A | 8/1897 | Peters |
| 688,076 A | 12/1901 | Ensign |
| D188,376 S | 7/1960 | Hotkins et al. |

(Continued)

FOREIGN PATENT DOCUMENTS

| | | |
|---|---|---|
| DE | 40 04 554 | 8/1991 |
| DE | 195 02 918 | 8/1996 |

(Continued)

OTHER PUBLICATIONS

Addlesee, M.D., et al., "The ORL Active Floor," IEEE—Personal Communications, Oct. 1997.

(Continued)

*Primary Examiner* — Kang Hu
(74) *Attorney, Agent, or Firm* — Nixon & Vanderhye P.C.

(57) ABSTRACT

A load detecting apparatus includes a load controller. In order to identifying predetermined number of motions performed on the load controller by the player, for example, a condition of a ratio of load values to a body weight value and a condition relating to a position of a center of gravity are defined in advance. The ratio of the detected load values to the body weight value and the position of the center of gravity are calculated, and on the basis of the ratio and the position of the center of gravity, a motion performed on the load controller by the player is determined.

9 Claims, 19 Drawing Sheets

(56) References Cited

U.S. PATENT DOCUMENTS

| | | |
|---|---|---|
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,076,584 A * | 12/1991 | Openiano ............... 463/36 |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nashner et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |
| 6,147,674 A | 11/2000 | Rosenberg et al. |

(56) References Cited

U.S. PATENT DOCUMENTS

| | | | |
|---|---|---|---|
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,085 B1 | 8/2002 | Lauer |
| D462,683 S | 9/2002 | Ashida |
| 6,450,886 B1 * | 9/2002 | Oishi et al. ............... 463/36 |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,685,480 B2 * | 2/2004 | Nishimoto et al. ........... 434/247 |
| 6,695,694 B2 * | 2/2004 | Ishikawa et al. ................ 463/7 |
| 6,697,049 B2 | 2/2004 | Lu |
| 6,719,667 B2 | 4/2004 | Wong et al. |
| 6,726,566 B2 | 4/2004 | Komata |
| 6,734,856 B2 * | 5/2004 | Ishikawa et al. ........... 345/440 |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | Lavelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 8,075,449 B2 * | 12/2011 | Lee ................................. 482/8 |
| 2001/0001303 A1 | 5/2001 | Ohsuga et al. |
| 2001/0018363 A1 | 8/2001 | Goto et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander et al. |
| 2003/0109298 A1 | 6/2003 | Oishi et al. |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0147317 A1 * | 7/2004 | Ito et al. ..................... 463/36 |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | Dicuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217233 A1 * | 9/2006 | Lee ................................. 482/9 |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |

(56) References Cited

U.S. PATENT DOCUMENTS

| | | |
|---|---|---|
| 2007/0155589 A1 | 7/2007 | Feldman et al. |
| 2007/0219050 A1 | 9/2007 | Merril |
| 2008/0012826 A1 | 1/2008 | Cunningham et al. |
| 2008/0228110 A1 | 9/2008 | Berme |
| 2008/0261696 A1 | 10/2008 | Yamazaki et al. |
| 2009/0093315 A1 | 4/2009 | Matsunaga et al. |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-34016 | 2/1987 |
| JP | 62-034016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 8-182774 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-175279 | 6/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Baek, Seongmin, et al., "Motion Evaluation for VR-based Motion Training," Eurographics 2001, vol. 20, No. 3, 2001.

Biodex Medical Systems, Inc.—Balance System SD Product Information—http://www.biodex.com/rehab/balance/balance_300feat.htm.

Chen, I-Chun, et al., "Effects of Balance Training on Hemiplegic Stroke Patients," Chang Gung Medical Journal, vol. 25, No. 9, pp. 583-590, Sep. 2002.

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the University of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitation Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

NeuroCom International, Inc.—Balance Manager Systems/Products—http://resourcesonbalance.com/neurocom/products/index.aspx.

NeuroCom International, Inc.—Neurogames—http://resourcesonbalance.com/neurocom/products/NeuroGames.aspx.

Nicholas, Deborah S, "Balance Retraining After Stroke Using Force Platform Feedback," Physical Therapy, vol. 77, No. 5, pp. 553-558, May 1997.

Nintendo Co., Ltd.—Aerobic Exercise Rhythm Boxing—http://www.nintendo.co.jp/wii/rfnj/training/aerobics/aerobics07.html.

(56) References Cited

OTHER PUBLICATIONS

Redfern, Mark, et al., "Visual Influences of Balance," Journal of Anxiety Disorders, vol. 15, pp. 81-94, 2001.
Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.
Tossavainen, Timo, et al., "Postural Control as Assessed with Virtual Reality," Acta Otolaryngol, Suppl 545, pp. 53-56, 2001.
Tossavainen, Timo, et al., "Towards Virtual Reality Simulation in Force Platform Posturography," MEDINFO, pp. 854-857, 2001.
Tsutsuguchi, Ken, et al., "Human Walking Animation Based on Foot Reaction Force in the Three-Dimensional Virtual World," The Journal of Visualization and Computer Animation, vol. 11, pp. 3-16, 2000.
Wong, Alice, et al., "The Devlopment and Clinical Evaluation of a Standing Biofeedback Trainer," Journal of Rehabilitation Research and Development, vol. 34, No. 3, pp. 322-327, Jul. 1997.
Yang, Ungyeon, et al., "Implementation and Evaluation of 'Just Follow Me': An Immersive, VR-Based, Motion-Training System," Presence, vol. 11, No. 3, pp. 304-323, 2002.
Nintendo Co., Ltd. and Nintendo of America's Opposition to IA Labs CA, LLC's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), including the Appendix of Exhibits and Exhibits A-R, 405 pages.
Declaration of R. Lee Rawls in Support of Nintendo Co., Ltd. and Nintendo of America Inc.'s Opposition to IA Labs CA. LLC's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), including Exhibits 1, 3-12, 193 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Appendix of Exhibits, 2 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 1, 36 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 2, 40 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 3, 85 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 4, 10 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 5, 9 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 6, 17 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 7, 16 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 8, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 9, 4 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 14, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC,* (Plaintiff) v. *Nintendo Co., Ltd. et al.,* (Defendant), United States District Court for the District of Maryland Southern Division (May 16, 2011), Exhibit 16, 42 pages.

(56) References Cited

OTHER PUBLICATIONS

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 18, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 23, 20 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 26, 32 pages.
U.S. Trademark Application No. 74/402,755 filed Jun. 14, 1993, 43 pages.
"AccuSway Dual Top: For Balance and Postural Sway Measurement," AMTI: Force and Motion, ISO 9001:2000, 2 pages.
Borzelli G., Cappozzo A., and Papa E., "Inter- and intra-individual variability of ground rejection forces during sit-to-stand with principal component analysis," Medical Engineering & Physics 21 (1999), pp. 235-240.
Chiari L., Cappello A., Lenzi D., and Della Croce U, "An Improved Technique for the Extraction of Stochasitc Parameters from Stabilograms," Gait and Posture 12 (2000), pp. 225-234.
Cutlip R., Hsiao H., Garcia R., Becker E., Mayeux B., "A comparison of different postures for scaffold end-frame disassembly," Applied Ergonomics 31 (2000), pp. 507-513.
Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.
Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.
Jorgensen M.J., Marras W.S., "The effect of lumbar back support tension on trunk muscle activity," Clinical Biomechanics 15 (2000), pp. 292-294.
Deborah L. King and Vladimir M. Zatsiorsky, "Extracting gravity line displacement from stabilographic recordings," Gait & Posture 6 (1997), pp. 27-38.
Kraemer W.J., Volek J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.
Papa E. and Cappozzo A., "A telescopic inverted-pendulum model of the musculo-skeletal system and its use for the analysis of the sit-to-stand motor task," Journal of Biomechanics 32 (1999), pp. 1205-1212.
Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).
BERTEC: Dominate Your Field, Physician's Quick Guide, Version 1.0.0, Feb. 2010, 13 pages.
BERTEC: Dominate Your Field, Balancecheck Screener, Version 1.0.0, Feb. 2010, 35 pages.
BERTEC: Dominate Your Field, Balancecheck Trainer, Version 1.0.0, Feb. 2010, 37 pages.
BERTEC Corporation—Balancecheck Standard Screener Package, http://bertec.com/products/balance-systems/standard-screener.html, 1 page. (Retrieved Apr. 12, 2011).
BERTEC Corporation—Balance Systems: Balancecheck Advanced balance assessment & training products for the balance professional, http://bertec.com/products/balance-systems.html, 1 page. (Retrieved Mar. 31, 2011).
BERTEC Corporation—Balancecheck Mobile Screener Package: Portable balance screening with full functionality, http://bertec.com/products/balance-systems/mobile-screener.html, 1 page. (Retrieved Mar. 31, 2011).
BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).
U.S. Trademark Application No. 75/136,330 filed Jul. 19, 1996, 47 pages.
BERTEC: Dominate Your Field, Digital Acquire 4, Version 4.0.10, Mar. 2011, 22 pages.
BERTEC: Dominate Your Field, Bertec Force Plates, Version 1.0.0, Sep. 2009, 31 pages.
BERTEC: Dominate Your Field, Product Information: Force Plate FP4060-08:Product Details and Specifications, 4 pages.
BERTEC: Dominate Your Field, Product Information: Force Plate FP4060-10:Product Details and Specifications, 2 pages.
U.S. Trademark Application No. 73/542,230 filed Jun. 10, 1985, 52 pages.
Brent L. Arnold and Randy J. Schmitz, "Examination of Balance Measures Produced by the Biodex Stability System," Journal of Athletic Training, vol. 33(4), 1998, pp. 323-327.
Trademark Registration No. 1,974,115 filed Mar. 28, 1994, 8 pages.

(56) References Cited

OTHER PUBLICATIONS

ICS Balance Platform, Fall Prevention: Hearing Assessment, Fitting Systems, Balance Assessment, Otometrics: Madsen, Aurical, ICS, 2 pages.
U.S. Trademark Application No. 75/471,542 filed Apr. 16, 1998, 102 pages.
VTI Force Platform, Zapconnect.com: Medical Device Industry Portal, http://zapconnect.com/products/index.cfm/fuseaction/products, 2 pages. (Retrieved Apr. 5, 2011).
Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.
Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.
Dr. Guido Pagnacco, Publications, 1997-2008, 3 pages.
College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).
EyeTracker, IDEAS, DIFRA, 501(k) Summary: premarket notification, Jul. 5, 2007, 7 pages.
Vestibular technologies, copyright 2000-2004, 1 page.
Scopus preview—Scopus—Author details (Pagnacco, Guido), http:www.scopus.com/authid/detail.url?authorId=6603709393, 2 pages. (Retrieved Apr. 20, 2011).
Vestibular Technologies Company Page, "Vestibular technologies: Helping People Regain their Balance for Life," http:www.vestibtech.com/AboutUs.html, 2 pages. (Retrieved Apr. 20, 2011).
GN Otometrics Launces ICS Balance Platform: Portable system for measuring postural sway, http://audiologyonline.com/news/pf_news_detail.asp?news_id=3196, 1 page. (Retrieved Mar. 31, 2011).
U.S. Trademark Application No. 75/508,272 filed Jun. 25, 1998, 36 pages.
U.S. Trademark Application No. 75/756,991 filed Jul. 21, 1999, 9 pages.
U.S. Trademark Application No. 76/148,037 filed Oct. 17, 2000, 78 pages.
Vestibular technologies, VTI Products: BalanceTRAK User's Guide, Preliminary Version 0.1, 2005, 34 pages.
U.S. Trademark Application No. 76/148,037 filed Oct. 17, 2000, 57 pages.
Vestibular Technologies, Waybackmachine, http://vestibtech.com/balancetrak500.html, 7 pages. (Retrieved Mar. 30, 2011).
Vestibular Technologies, 2004 Catalog, 32 pages.
The Balance Trak 500—Normative Data, 8 pages.
State of Delaware: The Official Website of the First State, Division of Corporations—Online Services, http://delecorp.delaware.gov/tin/controller, 2 pages. (Retrieved Mar. 21, 2011).
Memorandum in Support of Plaintiff IA Labs' Motion for Partial Summary Judgment on Defendants' Affirmative Defense and Counterclaim That U.S. Pat. No. 7,121,982 Is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.
Interface, Inc.—Advanced Force Measurement—SM Calibration Certificate Installation Information, 1984.
Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.
Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.
D. Sengupta, et al., "Comparative Evaluation of Control Surfaces for Disabled Patients," Proceedings of the 27th Annual Conference on Engineering in Medicine and Biology, vol. 16, Oct. 6-10, 1974, p. 356.
Ian Bogost, "The Rhetoric of Exergaming," The Georgia Institute of Technology, 9 pages (date unknown).
Ludonauts, "Body Movin'," May 24, 2004, http://web.archive.org/web/20040611131903/http:/www.ludonauts.com; retrieved Aug. 31, 2010, 4 pages.
Atari Gaming Headquarters—AGH's Atari Project Puffer Page, http://www.atarihq.com/othersec/puffer/index.html, retrieved Sep. 19, 2002, 4 pages.
Michael Antonoff, "Real estate is cheap here, but the places you'd most want to visit are still under construction," Popular Science, Jun. 1993, pp. 33-34.
Steve Aukstakalnis and David Blatner, "The Art and Science of Virtual Reality—Silicon Mirage," 1992, pp. 197-207.
Electronics, edited by Michael Antonoff, "Video Games—Virtual Violence: Boxing Without Bruises," Popular Science, Apr. 1993, p. 60.
Stuart F. Brown, "Video cycle race," Popular Science, May 1989, p. 73.
Scanning the Field for Ideas, "Chair puts Player on the Joystick," Machine Design, No. 21, Oct. 24, 1991, XP 000255214, 1 page.
Francis Hamit, "Virtual Reality and the Exploration of Cyberspace," University of MD Baltimore County, 1993, 4 pages.
Innovation in Action—Biofeed back Motor Control, Active Leg Press—IsoLegPress, 2 pages (date unknown).
Ric Manning, "Videogame players get a workout with the Exertainment," The Gizmo Page from the Courier Journal Sep. 25, 1994, 1 page.
Tech Lines, Military—Arcade aces and Aviation—Winging it, Popular Mechanics, Mar. 1982, p. 163.
Sarju Shah, "Mad Catz Universal MC2 Racing Wheel: Mad Catz MC2 Universal," Game Spot, posted Feb. 18, 2005, 3 pages.
Joe Skorupa, "Virtual Fitness," Sports Science, Popular Mechanics, Oct. 1994, 3 pages.
AGH Musuem—Suncom Aerobics Joystick; http://atarihq.com/museum/2678/hardware/aerobics.html, (retrieved date unknown) 1 page.
Nintendo Zone—The History of Nintendo (1889-1997), retrieved Aug. 24, 1998 pp. 1, 9-10.
The Legible City, Computergraphic Installation with Dirk Groeneveld, Manhattan version (1989), Amsterdam version (1990), Karlsruhe version (1991), 3 pages.
The New Exertainment System, It's All About Giving Your Members Personal Choices, Life Fitness, Circle Reader Service Card No. 28, 1995, 1 page.
The Race Begins with $85, Randal Windracer, Circle Reader Service Card No. 34, 1990, 1 page.
Universal S-Video/Audio Cable; Product #5015, MSRP 9.99; http://www.madcatz.com/Default.asp?Page=133 &CategoryImg=Universal_Cables, retrieved May 12, 2005, 1 page.
Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.
Linda S. Miller, "Upper Limb Exerciser," Biometrics Ltd—Unique Solutions for Clinical and Research Applications, 6 pages (date unknown).
Raymond W. McGorry, "A system for the measurement of grip forces and applied moments during hand tool use," Liberty Mutual Research Center for Safety and Health, Applied Ergonomics 32 (2001) 271-279.
NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.
Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.
Leigh Ann Roman, "Boing! Combines Arcade Fun with Physical Training," Memphis—Health Care News: Monitoring the Pulse of Our Health Care Community, Sep. 20, 1996, One Section, 1 page.
"No More Couch Potato Kids," as shown in Orange Coast, Sep. 1994, p. 16.

(56) References Cited

OTHER PUBLICATIONS

Gary L. Downey, et al., "Design of an Exercise Arcade for Children with Disabilities," Resna, Jun. 26-30, 1998, pp, 405-407.
Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.
Carolyn Cosmos, "An 'Out of Wheelchair Experience'", The Washington Post, May 2, 2000, 3 pages.
"Look Ma! No Hands!", The Joyboard—Power Body Control, (date unknown).
David H. Ahl, "Controller update," Creative Computing, vol. 9, No. 12, Dec. 1983, p. 142.
Ian Bogost, "Water Cooler Games—The Prehistory of Wii Fit," Videogame Theory, Criticism, Design, Jul. 15, 2007, 2 pages.
Jeremy Reimer, "A history of the Amiga, part 2: The birth of Amiga," last updated Aug. 12, 2007, 2 pages.
The Amiga Joyboard (1982) image, Photos: Fun with plastic—peripherals that changed gaming; http://news.cnet.com/2300-27076_3-10001507-2.html (retrieved Jul. 23, 2010), 1 page.
The Amiga Power System Joyboard, Amiga history guide, http://www.amigahistory.co.uk/joyboard.html (retrieved Jul. 23, 2010), 2 pages.
"Joyboard," Wikipedia—the free encyclopedia, http://en.wikipedia.org/wiki/Joyboard (retrieved Jul. 26, 2010), 2 pages.
"Dance Dance Revolution," Wikipedia—the free encyclopedia, http://en.wikipedia.org/wiki/Dance Dance Revolution (retrieved Jul. 23, 2010), 9 pages.
"Cure for the couch potato," Kansas City Star (MO), Jan. 2, 2005, WLNR 22811884, 1 page.
JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.
Family Fun Fitness, Nintendo Entertainment System, Bandai, (date unknown).
"Power Pad/Family Fun and Fitness/Family Trainer," http://www.gamersgraveyard.com/repository/nes/peripherals/powerpad.html (retrieved Jul. 26, 2010), 2 pages.
"Power Pad Information," Version 1.0 (Sep. 23, 1999) http://www.gamersgraveyard.com/repository/nes/peripherals/powerpad.txt (retrieved Jul. 26, 2010), 2 pages.
Wii+Power+Pad.jpg (image), http://bp1.blogger.com/_J5LEiGp54I/RpZbNpnLDgI/AAAAAAAAAic/Gum6DD3Umjg/s1600-h/Wii+Power+Pad.jpg (retrieved Jul. 26, 2010), 1 page.
Vs. Slalom—Videogame by Nintendo, KLOV—Killer List of Video Games, http://www.arcade-museum.com/game_detail.php?game_id-10368 (retrieved Jul. 26, 2010), 3 pages.
"Nintendo Vs. System," Wikipedia—the free encyclopedia, http://en.wikipedia.org/wiki/Nintendo_Vs._System (retrieved Jul. 26, 2010), 3 pages.
Vs. Slalom—Step Up to the Challenge, Nintendo, (date unknown).
Vs. Slalom—Live the Thrill, Nintendo, (date unknown).
Vs. Slalom—Operation Manual, MDS(MGS), Nintendo, 4 pages, (date unknown).
HyperspaceArcade.com—Specialists in Arcade Video Game Repair and Restoration, http://www.hyperspacearcade.com/VSTypes.html (retrieved Jul. 3, 2010), 3 pages.
Vs. Slalom—Attachment Pak Manual; For Installation in: VS. UniSystem (UPRIGHT) and VS. DualSystem (UPRIGHT), TM of Nintendo of America Inc., 1986, 15 pages.
Leiterman, "Project Puffer: Jungle River Cruise," Atari, Inc., 1982, 2 pages.
Leiterman, "Project Puffer: Tumbleweeds," Atari, Inc., 1982, 1 page.
Jerry Smith, "Other Input Devices," Human Interface Technology Laboratory, 2 pages, (date unknown).
Trevor Meers, "Virtually There: VR Entertainment Transports Players to Entrancing New Worlds," Smart Computing, vol. 4, Issue 11, Nov. 1993, 6 pages.
"Dance Aerobics," Moby Games, Feb. 12, 2008, 2 pages.
"Hard Drivin'," KLOV—Killer List of Video Games, The International Arcade Museum, http://www.arcade-museum.com, 6 pages, (date unknown).
"The World's First Authentic Driving Simulation Game!", Hard Drivin'—Get Behind the Wheel and Feel the Thrill (image), Atari games Corporation, 1 page, (date unknown).
Electronic Entertainment Expo (E3) Overview, Giant Bomb—E3 2004 (video game concept), http://www.giantbomb.com/e3-2004/92-3436/ (retrieved Sep. 3, 2010), 3 pages.
Guang Yang Amusement, Product Name: Live Boxer, 1 page, (date unknown).
Family Fun Fitness: Basic Set (Control Mat and Athletic World Game Pak), Nintendo Entertainment System, Bandai, (date unknown).
Roll & Rocker (image), 1 page, (date unknown).
Roll & Rocker, Enteractive (image), 2 pages, (date unknown).
Michael Goldstein, "Revolution on Wheels—Thatcher Ulrich," Nov.-Dec. 1994, 3 pages.
"Playboy on the Scene: Ride On!", 1 page, (date unknown).
Candace Putnam, "Software for Hardbodies: A virtual-reality hike machine takes you out on the open road," Design, 1 page, (date unknown).
Rachel, "No-Sweat Exercise—Can you get healthier without really trying?" Fitness, 1 page, (date unknown).
Fitness article, Sep. 1994, p. 402-404.
"Wired Top 10: Best Selling Toys in Jun. 1994," Wired Sep. 1994, 1 page.
"Top Skater," Sega Amusements U.S.A, Inc, 1 page, (date unknown).
Katharine Alter, et al., "Video Games for Lower Extremity Strength Training in Pediatric Brain Injury Rehabilitation," National Rehabilitation Hospital, 18 pages, (date unknown).
Cateye Recumbent GameBike Pro: Latest Technology in Exercise Bikes, beyondmoseying.com High Performance Exercise Equipment, 2 pages (advertisement; no date).
Fitness Fun, while Exercising and Getting FIT for Kids, Teens and Adults, (advertisement, no date).
Warranty Information and Your Joyboard: How it Works, Amiga Corporation, date unknown, 2 pages.
Complaint for Patent Infringement, *IA Labs CA, LLC v. Nintendo Co., Ltd. and Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC v. Nintendo Co., Ltd. and Nintendo of America, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC v. Nintendo Co., Ltd. and Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC v. Nintendo Co., Ltd. and Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC v. Nintendo Co., Ltd. and Nintendo of America, Inc.*, United States District Court for the District of Maryland Southern Division (Jan. 6, 2011), 25 pages.
Expert Report of Lee Rawls, Nov. 2, 2010, 37 pages (redacted).
Search Report (2 pgs.) dated May 27, 2011 issued in German Application No. 20 2004 021 793.7.
Japanese Office Action issued for corresponding Japanese Patent Application No. 2007-263804 dated May 8, 2012 with English translation.

\* cited by examiner

FIG. 11
(A) FIRST STEP
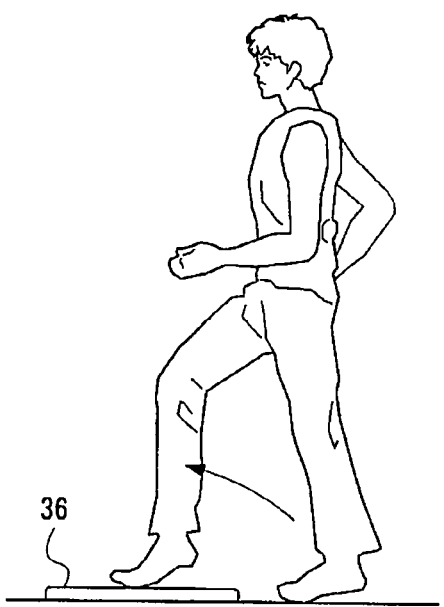
(B) SECOND STEP
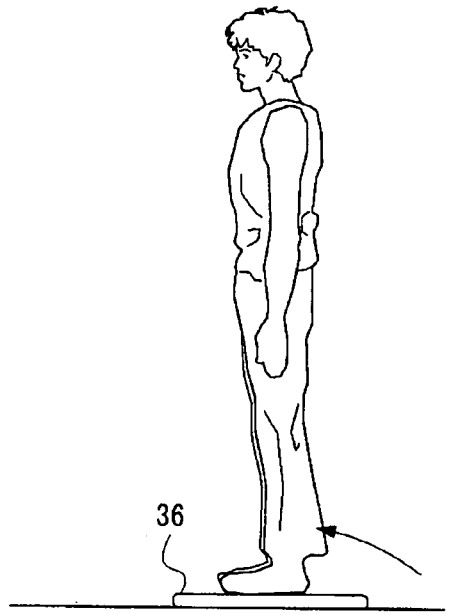
(C) THIRD STEP
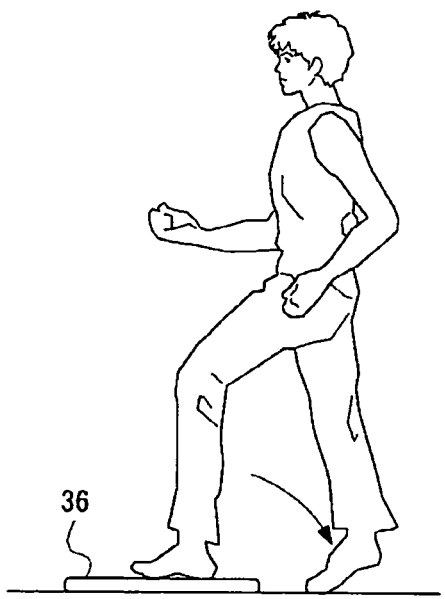
(D) FOURTH STEP
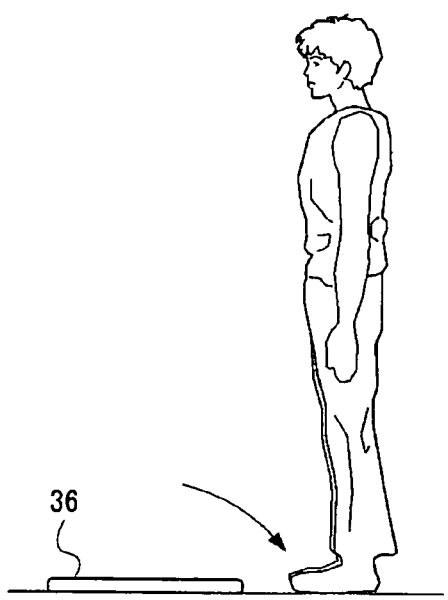

FIG. 12
(A)  FIRST STEP
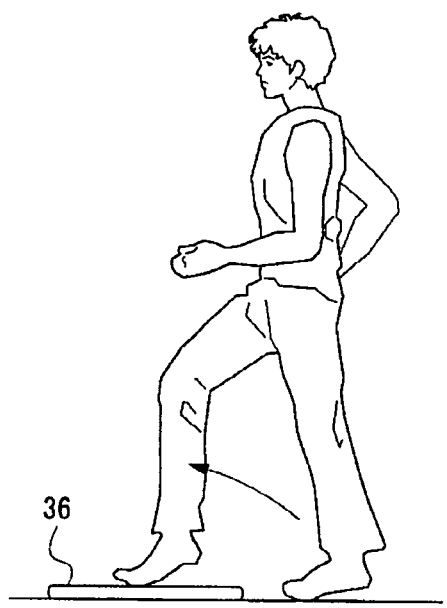
(B)  SECOND STEP
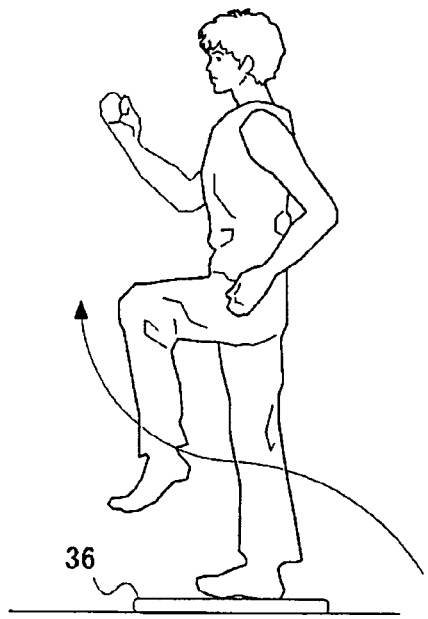
(C)  THIRD STEP
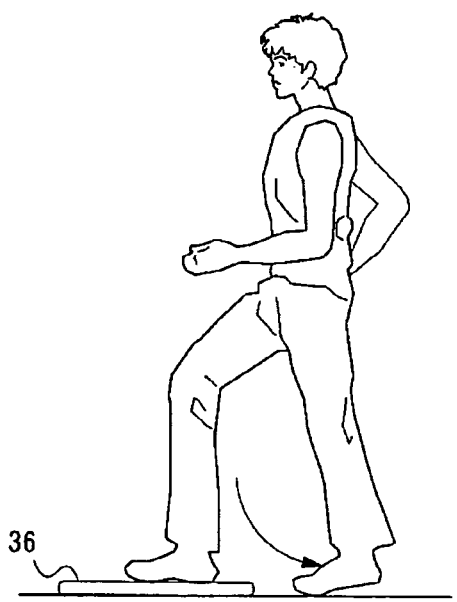
(D)  FOURTH STEP
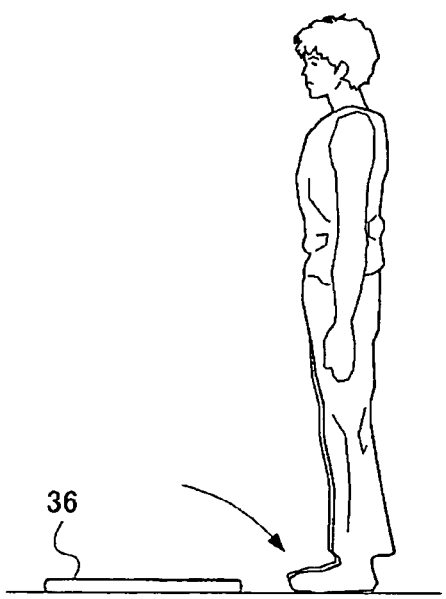

FIG. 13

MOTION IDENTIFYING CONDITION TABLE

| MOTION | RATIO OF LOAD VALUES TO BODY WEIGHT VALUE | POSITION OF THE CENTER OF GRAVITY |
|---|---|---|
| RIGHT FOOT RIDING (LEFT FOOT PUTTING DOWN) | 25 TO 75% | +0.01 TO +1.0 |
| BOTH FEET RIDING | MORE THAN 95% | −0.7 TO +0.7 |
| LEFT FOOT RIDING (RIGHT FOOT PUTTING DOWN) | 25 TO 75% | −1.0 TO −0.01 |
| LEFT THIGH LIFTING | MORE THAN 100% | +0.01 TO +1.0 |
| RIGHT THIGH LIFTING | MORE THAN 100% | −1.0 TO −0.01 |
| BOTH FEET PUTTING DOWN | LESS THAN 5% | NOT CONSIDERED |

US 9,421,456 B2

STORAGE MEDIUM STORING A LOAD DETECTING PROGRAM AND LOAD DETECTING APPARATUS

CROSS REFERENCE OF RELATED APPLICATION

The disclosure of Japanese Patent Application No. 2007-263804 is incorporated herein by reference.

BACKGROUND OF THE INVENTION

1. Field of the Invention

The invention relates to a storage medium storing a load detecting program and a load detecting apparatus. More specifically, the present invention relates to a storage medium storing a load detecting program and a load detecting apparatus which perform processing by detecting load values put on a support board on which a foot of a player is put.

2. Description of the Related Art

Conventionally, a load detecting apparatus equipped with a sensor for detecting a load of a subject is known in a field of medical equipment for purpose of exercises such as rehabilitation.

For example, in a Patent Document 1 (Japanese Patent Application Laid-Open No. 62-34016 [G01G 19/00, A61B 5/10, A61H 1/00, G01G 23/37]), a variable load display apparatus provided with two load sensors is disclosed. In this apparatus, right and left feet are put on the respective load sensors one by one. From the display of the load values detected by the two load sensors, a balance between the right and left feet is measured.

Furthermore, in a Patent Document 2 (Japanese Patent Application Laid-open No. 7-275307 [A61H 1/02, A61B 5/11, A63B 23/04]), a center of gravity shift training apparatus with three load detecting means is disclosed. In this apparatus, both feet are put on a detection plate provided with the three load detecting means. By an arithmetic operation of signals detected from the three load detecting means, a position of the center of gravity is calculated and displayed, and whereby, training for shifting the center of gravity is performed.

However, in the above-described Patent Documents 1 and 2, although changes of the load in a state that the foot of the subject is put on the detection plate provided with the load detecting means (the balance between right and left and shift of the center of gravity) can be measured, it is difficult to determine a motion of putting up and down the foot on the detection plate by the subject such as a step-up-and-down exercise and a motion of lifting the thigh above the detection plate in such a balance between right and left and a shift of the center of gravity.

SUMMARY OF THE INVENTION

Therefore, it is a primary object of the present invention to provide a novel storage medium storing a load detecting program and a novel load detecting apparatus.

Another object of the present invention is to provide a storage medium storing a load detecting program and a load detecting apparatus which can determine motions such as putting a foot on and down from the support board, lifting the thigh on the support board by the player.

The present invention employs following features in order to solve the above-described problems. It should be noted that reference numerals inside the parentheses and the supplements show one example of a corresponding relationship with the embodiments described later for easy understanding of the present invention, and do not limit the present invention.

A first invention is a storage medium storing a load detecting program to be executed in a computer of a load detecting apparatus provided with a support board which has two or more load sensors spaced with each other, and on which a player puts his or her foot. The load detecting program causes the computer to execute a load value detecting step, a ratio calculating step, a position of the center of gravity calculating step, and a motion determining step. The load value detecting step detects load values put on the support board measured by the load sensor. The ratio calculating step calculates a ratio of the load values detected by the load detecting step to a body weight value of the player. The position of the center of gravity calculating step calculates a position of the center of gravity of the load values detected by the load detecting step. The motion determining step determines a motion performed on the support board by the player on the basis of the ratio and the position of the center of gravity.

In the first invention, the load detecting program is executed in a computer (40, 42) of a load detecting apparatus (10, 12), and causes the load detecting apparatus function as an apparatus for determining a motion by a player (user) on the basis of detected load values, for example. The load detecting apparatus has a support board (36) on which the foot of the player is put, and the support board is furnished with two or more load sensors (36b) spaced with each other. In a load value detecting step (S39), load values put on the support board which are measured by the load sensors are detected. Thus, load values corresponding to a motion by the player performed on the support board are detected. In a ratio calculating step (S41), a ratio of the detected load values to the body weight value of the player is calculated. In a position of the center of gravity calculating step (S43), a position of the center of gravity of the detected load values is calculated. In a motion determining step (S45, S113), a motion performed on the support board by the player is determined on the basis of the ratio and the position of the center of gravity. For example, as to each of the predetermined number of motions performed on the support board by the player, a condition of a ratio of the load values to the body weight value and a condition relating to the position of the center of gravity are defined and stored in advance. On the basis of the ratio and the position of the center of gravity calculated from the detected load values, whether or not a predetermined motion is performed, or by detecting a motion satisfying the conditions relating to the ratio and the position of the center of gravity, a motion performed by the player is specified.

According to the first invention, it is possible to determine a motion performed on the support board by the player on the basis of the ratio of the load values and the position of the center of gravity.

A second invention is a storage medium storing a load detecting program according to the first invention, and the motion determining step determines whether or not a predetermined motion is performed on the basis of the ratio and the position of the center of gravity.

In the second invention, in the motion determining step, by judging whether or not the calculated ratio of the load values to the body weight value and the position of the center of gravity respectively satisfy a condition of a ratio and a condition of the position of the center of gravity as to a predetermined motion, for example, it is determined whether or not the predetermined motion is performed by the player. By judging the ratio of the load values to the body weight value and the position of the center of gravity, it is possible to determine whether or not the predetermined motion is performed on the support board. Thus, it is possible to determine whether or not a motion of the step-up-and-down exercise, a thigh lifting motion, and etc. are performed on the support board.

A third invention is a storage medium storing a load detecting program according to the second invention, and the motion determining step further decides it is determined that the predetermined motion in a past is performed in the motion determining step in a past as a determination condition.

In the third invention, depending on whether or not the motion is performed in the past by the player, it is possible to decide whether or not a current motion can be executed.

A fourth invention is a storage medium storing a load detecting program according to the second invention, and the load detecting program causes the computer to further execute: an instructing step for instructing the player to perform any one motion out of a plurality of motions as the predetermined motion, and an elapsed time counting step for counting an elapsed time from when an instruction is given in the instructing step. The motion determining step determines whether or not the motion instructed in the instructing step is performed while the elapsed time falls within a predetermined time.

In the fourth invention, in an instructing step (S31), the player is instructed to perform any one motion out of a plurality of motions. The instruction of the motion may be performed by displaying panel (400) indicating the motion on the screen, or proper timing may be shown by timing of a movement and a stop of the panel, for example. In an elapsed time counting step (S33, S35), an elapsed time from when an instruction of the motion is given is counted. In the motion determining step, while the elapsed time is within a predetermined time, whether or not the instructed motion is performed is determined. That is, until the time limit expires, the determination is made on the basis of the ratio of the detected load values to the body weight value and the position of the center of gravity. If a predetermined motion is performed by the player before the predetermined time elapses from an instruction of the motion, it can be determined that the predetermined motion is performed. This makes it possible to instruct the player to perform a predetermined motion for each predetermined time to thereby make him or her perform a series of motions, such as a step-up-and-down exercise, and determine the motion.

A fifth invention is a storage medium storing a load detecting program according to the first invention, and the motion determining step specifies which motion is performed out of a plurality of motions set in advance on the basis of the ratio and the position of the center of gravity.

In the fifth invention, as to each of the plurality of motions set in advance, a condition of a ratio of the load values to the body weight value and a condition of a position of the center of gravity are previously decided, a motion satisfying both of the conditions are detected on the basis of the calculated ratio and position of the center of gravity, for example. By detecting load values put on the support board to thereby calculate the ratio of the load values to the body weight value and the position of the center of gravity, it is possible to specify which motion is performed by the player, out of the predetermined number of motions performed on the support board.

A sixth invention is a load detecting apparatus provided with a support board which has two or more load sensors spaced with each other, and on which a player puts his or her foot, and comprises a load value detecting means, a ratio calculation means, a position of the center of gravity calculation means, and a motion determining means. The load value detecting means detects load values put on the support board which are measured by the load sensor. The ratio calculation means calculates a ratio of the load values detected by the load detecting means to a body weight value of the player. The position of the center of gravity calculation means calculates a position of the center of gravity of the load values detected by the load detecting means. The motion determining means determines a motion performed on the support board by the player on the basis of the ratio and the position of the center of gravity.

The sixth invention is a load detecting apparatus to which the storage medium storing a load detecting program according to the first invention is applied, and has an advantage the same as that in the first invention.

According to the present invention, a ratio of the load values put on the support board to the body weight value and a position of the center of gravity are calculated, and determination is made on the basis of the ratio and the position of the center of gravity, so that it is possible to determine a motion performed on the support board by the player. For example, it is possible to determine whether or not a predetermined motion is performed, or it is possible to determine which motion is performed out of the plurality of motions set in advance.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an illustrative view showing one example of respective motions of a step-up-and-down exercise;

FIG. 12 is an illustrative view showing one example of respective motions of the step-up-and-down exercise incorporating a thigh lifting motion;

FIG. 13 is an illustrative view showing a motion identifying condition table;

DETAILED DESCRIPTION OF THE PREFERRED EMBODIMENTS

Figure 1:
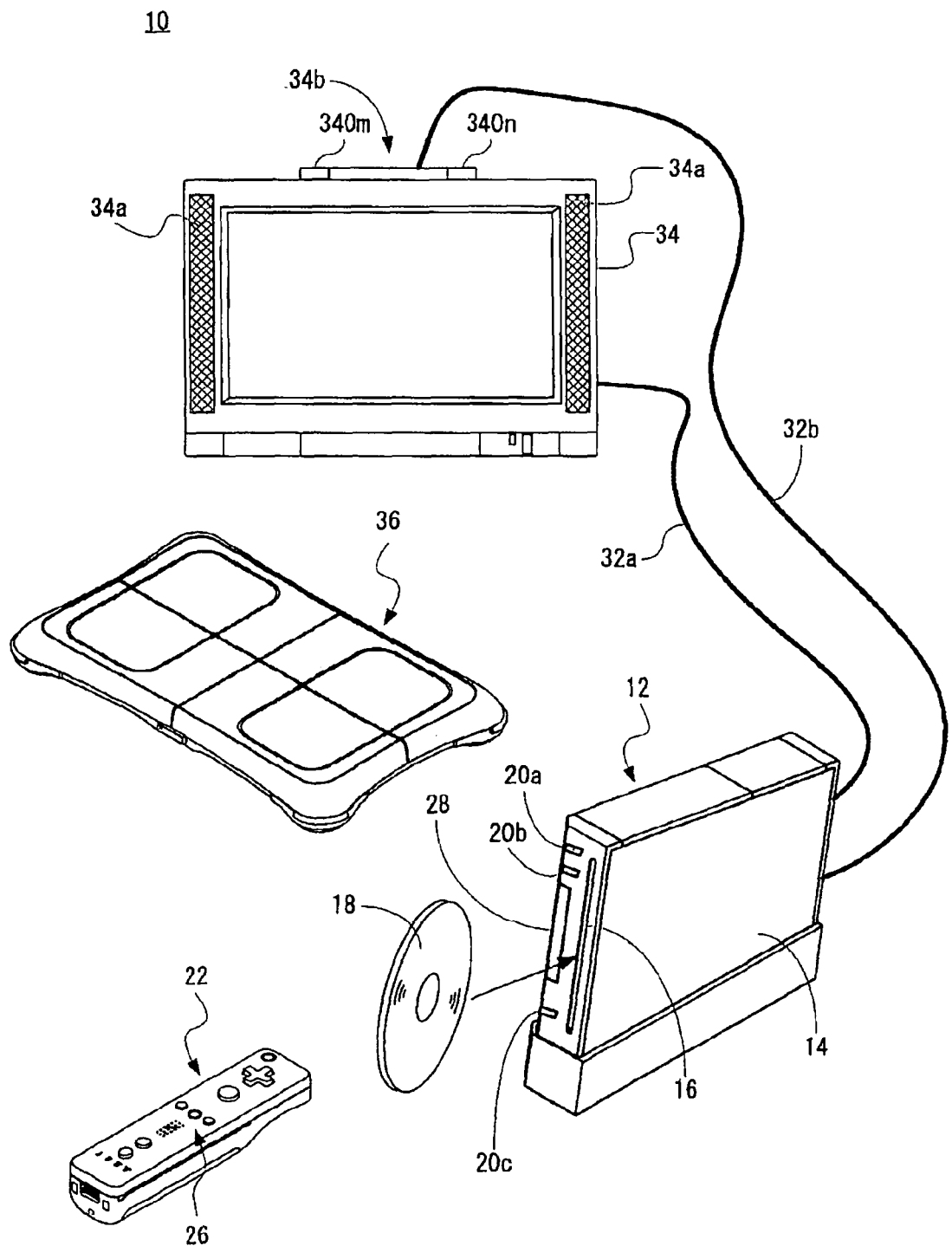
FIG. 1 is an illustrative view showing a game system of one embodiment of the present invention.

Referring to FIG. 1, a game system 10 of one embodiment of the present invention includes a video game apparatus (hereinafter, simply referred to as "game apparatus") 12, a controller 22 and a load controller 36. In this embodiment, the game apparatus 12 and the load controller 36 function as a load detecting apparatus. Although illustration is omitted, the game apparatus 12 of this embodiment is designed such that it can be connected to four controllers (22, 36) at the maximum. Furthermore, the game apparatus 12 and the respective controllers (22, 36) are connected by radio. The wireless communication is executed according to a Bluetooth (registered trademark) standard, for example, but may be executed by other standards such as infrared rays, a wireless LAN.

The game apparatus 12 includes a roughly rectangular parallelepiped housing 14, and the housing 14 is furnished with a disk slot 16 on a front surface. An optical disk 18 as one example of an information storage medium storing game program, etc. is inserted from the disk slot 16 to be loaded into a disk drive 54 (see FIG. 2) within the housing 14. Around the disk slot 16, an LED and a light guide plate are arranged so as to be light on or off in accordance with various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory.

It should be noted that a general-purpose SD card can be employed as a memory card, but other general-purpose memory cards, such as MemoryStick, Multimedia Card (registered trademark) can be employed.

The game apparatus 12 has an AV cable connector 58 (see FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights in front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game); Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the operating buttons of the input means 26, a game or other application is started. Besides the operation on the input means 26, by moving the controller 22 itself, it is possible to move a moving image object (player object) in different directions or change the perspective of the user (camera position) in a 3-dimensional game world.

Figure 2:
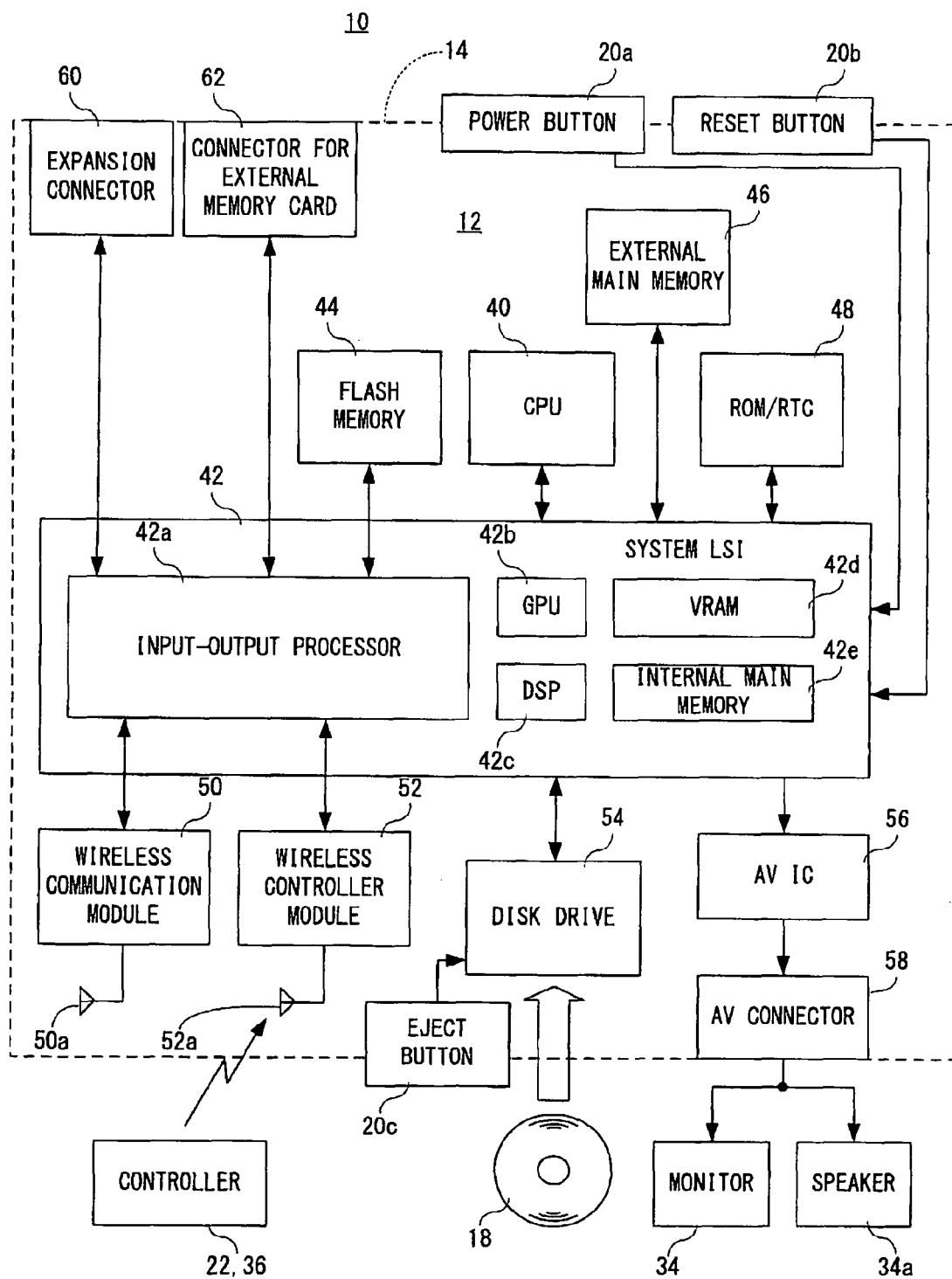
FIG. 2 is a block diagram showing one example of an electric configuration of the game system shown in FIG. 1.

FIG. 2 is a block diagram showing an electric configuration of the video game system 10 shown in FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program data, texture data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted.

The input-output processor (I/O processor) 42a executes transmitting and receiving data and executes downloading of the data. Reception and transmission and download of the data are explained in detail later.

The GPU 42b is made up of a part of a drawing means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction instruction. Additionally, the CPU 40 writes image data required for drawing to the VRAM 42d via the GPU 42b. The GPU 42b accesses the VRAM 42d to create game image data for drawing.

In this embodiment, a case that the GPU 42b generates game image data is explained, but in a case of executing an arbitrary application except for the game application, the GPU 42b generates image data as to the arbitrary application.

Furthermore, the DSP 42c functions as an audio processor, and generates audio data corresponding to a sound, a voice, music, or the like to be output from the speaker 34a by means of the sound data and the sound wave (tone) data stored in the internal main memory 42e and the external main memory 46.

The game image data and audio data generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

The input-output processor 42a can communicate with other game apparatuses and various servers to be connected to a network via a wireless communication module 50. It should be noted that it is possible to directly communicate with another game apparatus without going through the network. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. If the received data does not satisfy a predetermined condition, the reception data is abandoned as it is. In addition, the input-output processor 42a can receive data (download data) downloaded from the download server via the network, the antenna 50a and the wireless communication module 50, and store the download data in the flash memory 44.

Furthermore, the input-output processor 42a receives input data transmitted from the controller 22 and the load controller 36 via the antenna 52a and the wireless controller module 52, and (temporarily) stores it in the buffer area of the internal main memory 42e or the external main memory 46. The input data is erased from the buffer area after being utilized in game processing by the CPU 40.

In this embodiment, as described above, the wireless controller module 52 makes communications with the controller 22 and the load controller 36 in accordance with Bluetooth standards.

Furthermore, for the sake of the drawings, FIG. 2 collectively shows the controller 22 and the load controller 36.

In addition, the input-output processor 42a is connected with the expansion connector 60 and the connector for external memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the wireless communication module 50. The connector for external memory card 62 can be connected with an external storage like a memory card. Thus, the input-output processor 42a, for example, accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 sets a mode of a normal energized state (referred to as "normal mode") in which the respective components of the game apparatus 12 are supplied with power through an AC adapter not shown. On the other hand, when the power button 20a is turned off, the system LSI 42 sets a mode in which a part of the components of the game apparatus 12 is supplied with power, and the power consumption is reduced to minimum (hereinafter referred to as "standby mode"). In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, the standby mode is a mode in which the CPU 40 never executes an application.

Although the system LSI 42 is supplied with power even in the standby mode, supply of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20a is turned off, by making the standby mode unusable, the power supply to all the circuit components are completely stopped.

Furthermore, switching between the normal mode and the standby mode can be performed by turning on and off the power switch 26h (see FIG. 3) of the controller 22 by remote control. If the remote control is not performed, setting is made such that the power supply to the wireless controller module 52 is not performed in the standby mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Figure 3:
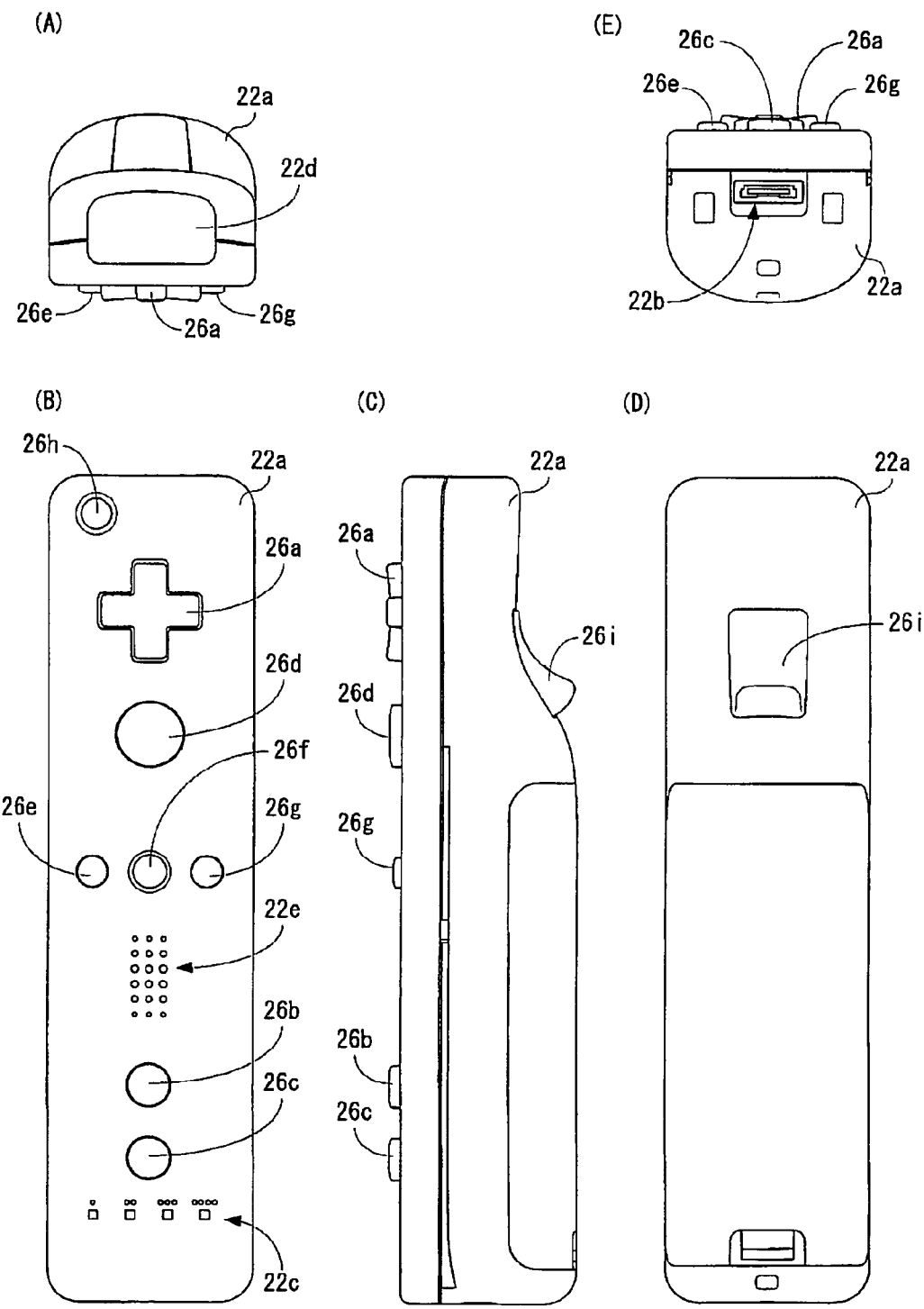
FIG. 3 is an illustrative view showing an appearance of a controller shown in FIG. 1.

Each of FIG. 3(A) to FIG. 3(E) shows one example of an external appearance of the controller 22. FIG. 3(A) shows a front end surface of the controller 22, FIG. 3 (B) shows a top surface of the controller 22, FIG. 3(C) shows a right side surface of the controller 22, FIG. 3(D) shows a lower surface of the controller 22, and FIG. 3(E) shows a back end surface of the controller 22.

Referring to FIG. 3(A) and FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on an upper face of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3(C) and FIG. 3(D), an inclined surface is formed on a lower surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 26b and the 2 button 26c are respectively push button switches, and are used for adjusting a viewpoint position and a viewpoint direction on displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (restarting) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action determined by the A-button 26d.

As shown in FIG. 3(E), an external expansion connector 22b is provided on a back end surface of the housing 22a, and as shown in FIG. 3(B), an indicator 22c is provided on the top surface and the side of the back end surface of the housing 22a. The external expansion connector 22b is utilized for connecting another expansion controller not shown. The indicator 22c is made up of four LEDs, for example, and shows identification information (controller number) of the controller 22 corresponding to the lighting LED by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3(A), on the front end surface of the housing 22a, light incident opening 22d of the imaged information arithmetic section 80 is provided. Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3(B).

Note that, the shape of the controller 22 and the shape, number and setting position of each input means 26 shown in FIG. 3(A) to FIG. 3(E) are simply examples, and needless to say, even if they are suitably modified, the present invention can be realized.

Figure 4:
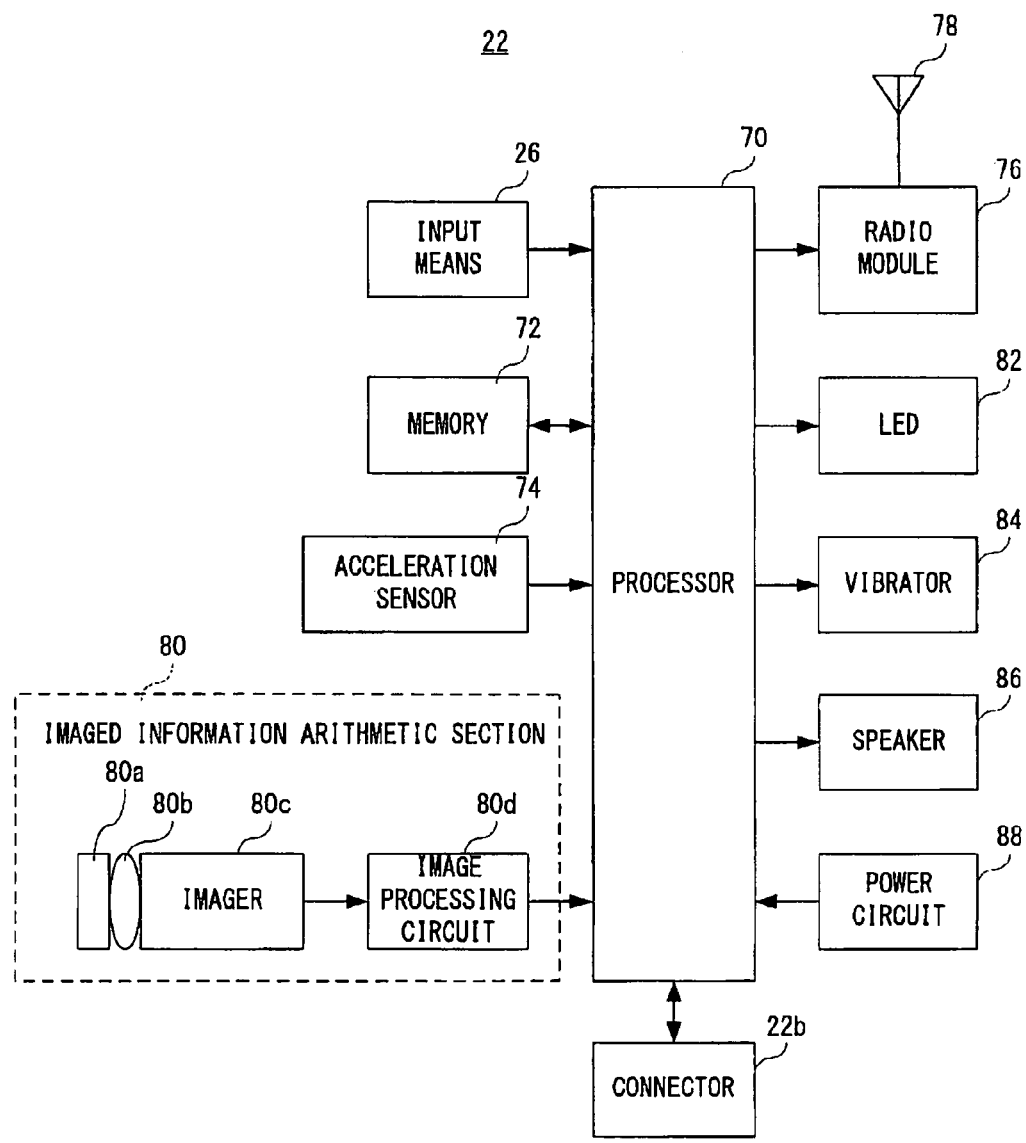
FIG. 4 is a block diagram showing one example of an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), a vibrator 84, a speaker 86, and a power supply circuit 88 by an internal bus (not shown). Moreover, an antenna 78 is connected to the radio module 76.

The processor 70 is in charge of an overall control of the controller 22, and transmits (inputs) information (input information) inputted by the input means 26, the acceleration sensor 74, and the imaged information arithmetic section 80 as input data, to the game apparatus 12 via the radio module 76 and the antenna 78. At this time, the processor 70 uses the memory 72 as a working area or a buffer area.

An operation signal (operation data) from the aforementioned input means 26 (26a to 26i) is inputted to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once. The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3(A) to FIG. 3(E), the acceleration sensor 74 is provided inside the housing 22a and in the vicinity on the circuit board where the cross key 26a is arranged.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the input data and the program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time. It should be noted that a description of the process in the image processing circuit 80d is made later.

Figure 5:
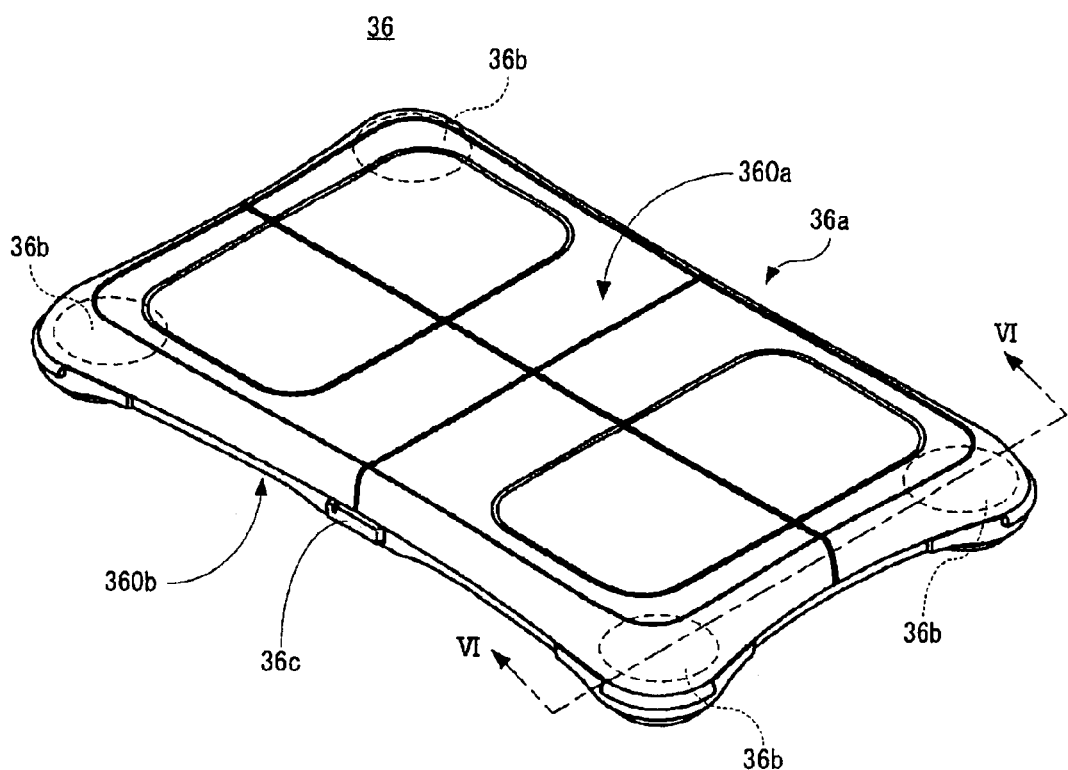
FIG. 5 is a perspective view showing a load controller shown in FIG. 1.

FIG. 5 is a perspective view showing an appearance of the load controller 36 shown in FIG. 1. The load controller 36 includes a board 36a on which a player rides (a player puts his or her foot) and at least four load sensors 36b that detect loads applied on the board 36a. The load sensors 36b are accommodated in the board 36a (see FIG. 7), and the arrangement of the load sensors 36b is shown by dotted line in FIG. 5.

The board 36a is formed in a substantially rectangle, and the board 36a has a substantially rectangular shape when viewed from above. For example, a short side of the rectangular is set in the order of about 30 cm, and a long side thereof is set in the order of 50 cm. An upper surface of the board 36a on which the player rides is formed in flat. Side faces at four corners of the board 36a are formed so as to be partially projected in a cylindrical shape.

In the board 36a, the four load sensors 36b are arranged at predetermined intervals. In the embodiment, the four load sensors 36b are arranged in peripheral portions of the board 36a, specifically, at the four corners. The interval between the load sensors 36b is set an appropriate value such that player's intention can accurately be detected for the load applied to the board 36a in a game manipulation.

Figure 6:
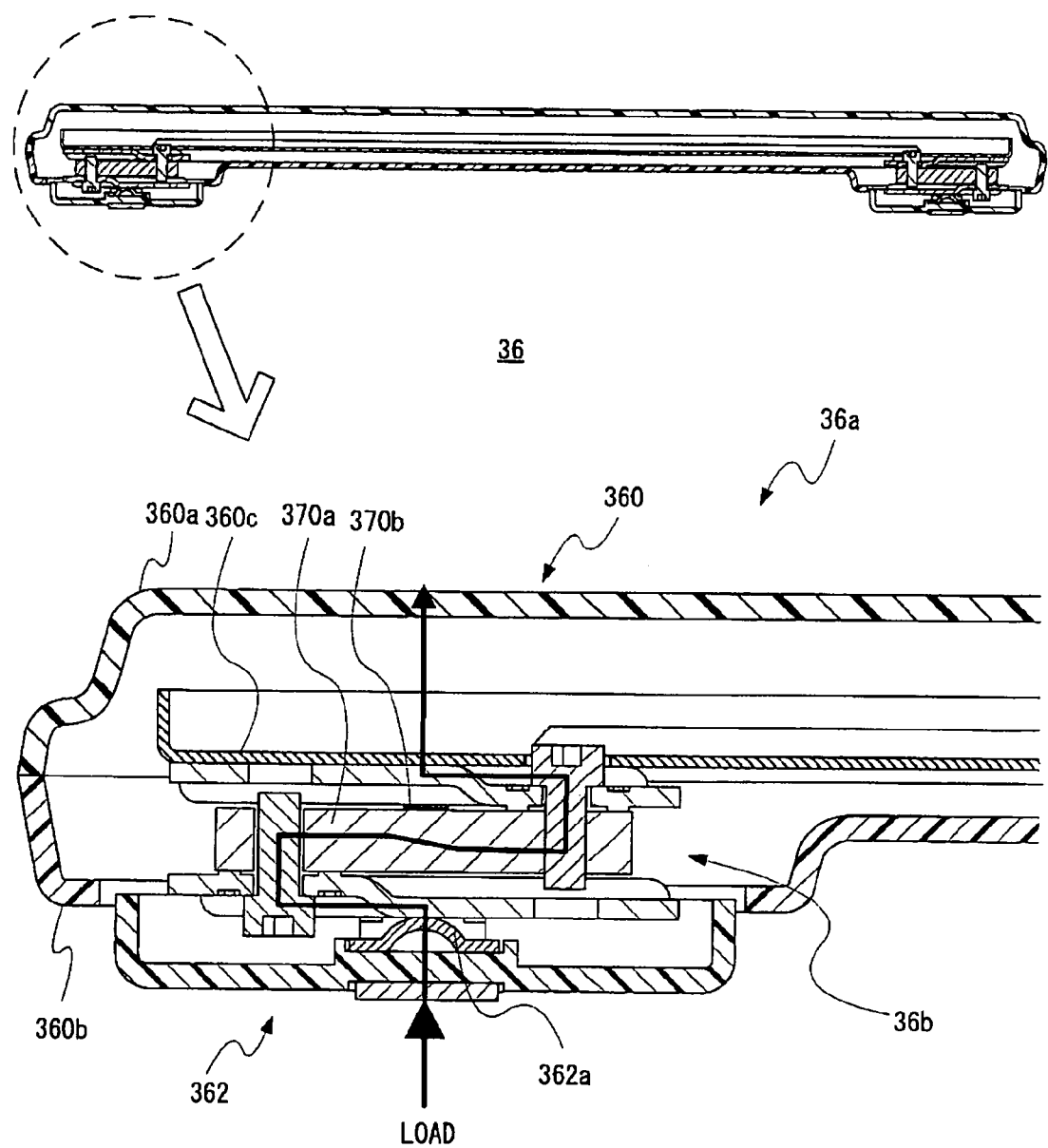
FIG. 6 is an illustrative view showing a cross section of the load controller shown in FIG. 5 taken along the line VI-VI.

FIG. 6 shows a sectional view taken along the line VI-VI of the load controller 36 shown in FIG. 5, and also shows an enlarged corner portion disposed in the load sensor 36b. As can be seen from FIG. 6, the board 36a includes a support plate 360 on which the player rides and legs 362. The legs 362 are provided at positions where the load sensors 36b are arranged. In the embodiment, because the four load sensors 36b are arranged at four corners, the four legs 362 are provided at the four corners. The leg 362 is formed in a cylindrical shape with bottom by, e.g., plastic molding. The load sensor 36b is placed on a spherical part 362a provided in the bottom of the leg 362. The support plate 360 is supported by the leg 362 while the load sensor 36b is interposed.

The support plate 360 includes an upper-layer plate 360a that constitutes an upper surface and an upper side face, a lower-layer plate 360b that constitutes a lower surface and a lower side face, and an intermediate-layer plate 360c provided between the upper-layer plate 360a and the lower-layer plate 360b. For example, the upper-layer plate 360a and the lower-layer plate 360b are formed by plastic molding and integrated with each other by bonding. For example, the intermediate-layer plate 360c is formed by pressing one metal plate. The intermediate-layer plate 360c is fixed onto the four load sensors 36b. The upper-layer plate 360a has a lattice-shaped rib (not shown) in a lower surface thereof, and the upper-layer plate 360a is supported by the intermediate-layer plate 360c while the rib is interposed. Accordingly, when the player rides on the board 36a, the load is transmitted to the support plate 360, the load sensor 36b, and the leg 362. As shown by an arrow in FIG. 6, reaction generated from a floor by the input load is transmitted from the legs 362 to the upper-layer plate 360a through the spherical part 362a, the load sensor 36b, and the intermediate-layer plate 360c.

The load sensor 36b is formed by, e.g., a strain gage (strain sensor) type load cell, and the load sensor 36b is a load transducer that converts the input load into an electric signal. In the load sensor 36b, a strain inducing element 370a is deformed to generate a strain according to the input load. The strain is converted into a change in electric resistance by a strain sensor 370b adhering to the strain inducing element 370a, and the change in electric resistance is converted into a change in voltage. Accordingly, the load sensor 36b outputs a voltage signal indicating the input load from an output terminal.

Other types of load sensors such as a folk vibrating type, a string vibrating type, an electrostatic capacity type, a piezoelectric type, a magneto-striction type, and gyroscope type may be used as the load sensor 36b.

Returning to FIG. 5, the load controller 36 is further provided with a power button 36c. When the power button 36c is turned on, power is supplied to the respective circuit components (see FIG. 7) of the load controller 36. It should be noted that the load controller 36 may be turned on in accordance with an instruction from the game apparatus 12. Furthermore, the power of the load controller 36 is turned off when a state that the player does not ride continues for a given time of period (30 seconds, for example). Alternatively, the power may be turned off when the power button 36c is turned on in a state that the load controller 36 is activated.

Figure 7:
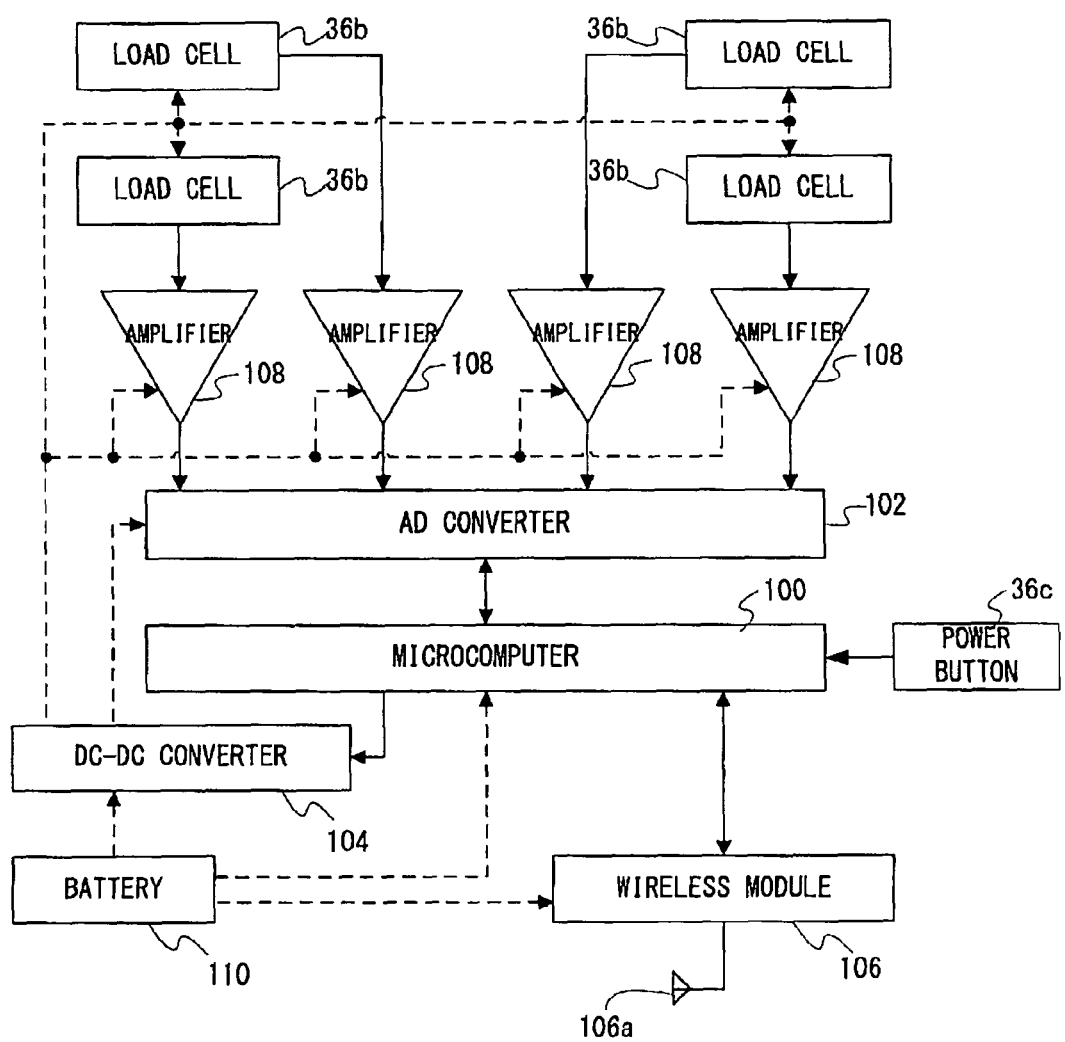
FIG. 7 is a block diagram showing one example of an electric configuration of the load controller shown in FIG. 5.

FIG. 7 is a block diagram showing an example of an electric configuration of the load controller 36. In FIG. 7, the signal and communication stream are indicated by solid-line arrows, and electric power supply is indicated by broken-line arrows.

The load controller 36 includes a microcomputer 100 that controls an operation of the load controller 36. The microcomputer 100 includes a CPU, a ROM and a RAM (not shown), and the CPU controls the operation of the load controller 36 according to a program stored in the ROM.

The microcomputer 100 is connected with the power button 36c, the A/D converter 102, a DC-DC converter 104 and a wireless module 106. In addition, the wireless module 106 is connected with an antenna 106a. Furthermore, the four load sensors 36b are displayed as a load cell 36b in FIG. 3.

Each of the four load sensors 36b is connected to the A/D converter 102 via an amplifier 108.

Furthermore, the load controller 36 is provided with a battery 110 for power supply. In another embodiment, an AC adapter in place of the battery is connected to supply a commercial power supply. In such a case, a power supply circuit has to be provided for converting alternating current into direct current and stepping down and rectifying the direct voltage in place of the DC-DC converter. In this embodiment, the power supply to the microcomputer 100 and the wireless module 106 are directly made from the battery. That is, power is constantly supplied to a part of the component (CPU) inside the microcomputer 100 and the wireless module 106 to thereby detect whether or not the power button 36c is turned on, and whether or not a power-on (load detection) command is transmitted from the game apparatus 12. On the other hand, power from the battery 110 is supplied to the load sensor 36b, the A/D converter 102 and the amplifier 108 via the DC-DC converter 104. The DC-DC converter 104 converts the voltage level of the direct current from the battery 110 into a different voltage level, and applies it to the load sensor 36b, the A/D converter 102 and the amplifier 108.

The electric power may be supplied to the load sensor 36b, the A/D converter 102, and the amplifier 108 if needed such that the microcomputer 100 controls the DC-DC converter 104. That is, when the microcomputer 100 determines that a need to operate the load sensor 36b to detect the load arises, the microcomputer 100 may control the DC-DC converter 104 to supply the electric power to each load sensor 36b, the A/D converter 102, and each amplifier 108.

Once the electric power is supplied, each load sensor 36b outputs a signal indicating the input load. The signal is amplified by each amplifier 108, and the analog signal is converted into digital data by the A/D converter 102. Then, the digital data is inputted to the microcomputer 100. Identification information on each load sensor 36b is imparted to the detection value of each load sensor 36b, allowing for distinction among the detection values of the load sensors 36b. Thus, the microcomputer 100 can obtain the pieces of data indicating the detection values of the four load sensors 36b at the same time.

On the other hand, when the microcomputer 100 determines that the need to operate the load sensor 36b does not arise, i.e., when the microcomputer 100 determines it is not the time the load is detected, the microcomputer 100 controls the DC-DC converter 104 to stop the supply of the electric power to the load sensor 36b, the A/D converter 102 and the amplifier 108. Thus, in the load controller 36, the load sensor 36b is operated to detect the load only when needed, so that the power consumption for detecting the load can be suppressed.

Typically, the time the load detection is required shall means the time the game apparatus 12 (FIG. 1) obtains the load data. For example, when the game apparatus 12 requires the load information, the game apparatus 12 transmits a load obtaining command to the load controller 36. When the microcomputer 100 receives the load obtaining command from the game apparatus 12, the microcomputer 100 controls the DC-DC converter 104 to supply the electric power to the load sensor 36b, etc., thereby detecting the load. On the other hand, when the microcomputer 100 does not receive the load obtaining command from the game apparatus 12, the microcomputer 100 controls the DC-DC converter 104 to stop the electric power supply.

Alternatively, the microcomputer 100 determines it is the time the load is detected at regular time intervals, and the microcomputer 100 may control the DC-DC converter 104. In the case when the microcomputer 100 periodically detects the load, information on the period may initially be imparted from the game apparatus 12 to the microcomputer 100 of the load controller 36 or previously stored in the microcomputer 100.

The data indicating the detection value from the load sensor 36b is transmitted as the manipulation data (input data) of the load controller 36 from the microcomputer 100 to the game apparatus 12 (FIG. 1) through the wireless module 106 and the antenna 106a. For example, in the case where the command is received from the game apparatus 12 to detect the load, the microcomputer 100 transmits the detection value data to the game apparatus 12 when receiving the detection value data of the load sensor 36b from the A/D converter 102. Alternatively, the microcomputer 100 may transmit the detection value data to the game apparatus 12 at regular time intervals. If the transmission cycle is longer than the detection cycle of the load, data including load values of the plurality of detection timings detected by the transmission timing is transmitted.

Additionally, the wireless module 106 can communicate by a radio standard (Bluetooth, wireless LAN, etc.) the same as that of the radio controller module 52 of the game apparatus 12. Accordingly, the CPU 40 of the game apparatus 12 can transmit a load obtaining command to the load controller 36 via the radio controller module 52, etc. The microcomputer 100 of the load controller 36 can receive a command from the game apparatus 12 via the wireless module 106 and the antenna 106a, and transmit input data including load detecting values (or load calculating values) of the respective load sensors 36b to the game apparatus 12.

For example, in the case of a game performed based on the simple total value of the four load values detected by the four load sensors 36b, the player can take any position with respect to the four load sensors 36b of the load controller 36, that is, the player can play the game while riding on any position of the board 36a with any orientation. However, depending on the type of the game, it is necessary to perform processing while determining toward which direction the load value detected by each load sensors 36b is orientated when viewed from the player. That is, it is necessary to understand a positional relationship between the four load sensors 36b of the load controller 36 and the player. For example, the positional relationship between the four load sensors 36b and the player is previously defined, and it may be assumed that the player rides on the board 36a such that the predetermined positional relationship is obtained. Typically, there is defined such the positional relationship that each two load sensors 36b exist at the front and the back of and on right and left sides of the player riding on the center of the board 36a, i.e. such the positional relationship that the load sensors 36b exist in the right front, left front, right rear, and left rear directions from the center of the player respectively when the player rides on the center of the board 36a of the load controller 36. In this case, in this embodiment, the board 36a of the load controller 36 takes shape of a rectangle in a plane view, and the power button 36c is provided on one side (long side) of the rectangle, and therefore, by means of the power button 36c as a mark, the player is informed in advance that he or she rides on the board 36a such that the long side on which the power button 36c is provided is positioned in a predetermined direction (front, back, left or right). Thus, a load value detected at each load sensor 36b becomes a load value in a predetermined direction (right front, left front, right back and left back) when viewed from the player. Accordingly, the load controller 36 and the game apparatus 12 can understand that to which direction each load detecting value corresponds, seen from the player on the basis of the identification information of each load sensor 36b included in the load detection value data and the arrangement data set (stored) in advance for indicating a position or a direction of each load sensor 36b with respect to the player. This makes it possible to grasp an intention of a game operation by the player such as an operating direction from front to back and from side to side, for example.

The arrangement of the load sensors 36b relative to the player is not previously defined but the arrangement may be set by the player's input in the initial setting, setting in the game, or the like. For example, the load is obtained while the screen in which the player instructed to ride on the portion in a predetermined direction (such as the right front, left front, right rear, and left rear directions) when viewed from the player. Therefore, the positional relationship between each load sensor 36b and the player can be specified, and the information on the arrangement by the setting can be generated and stored. Alternatively, a screen for selecting an arrangement of the load controller 36 is displayed on the screen of the monitor 34 to allow the player to select by an input with the controller 22 to which direction the mark (power button 36c) exists when viewed from the player, and in response to the selection, arrangement data of each load sensor 36b may be generated and stored.

Figure 8:
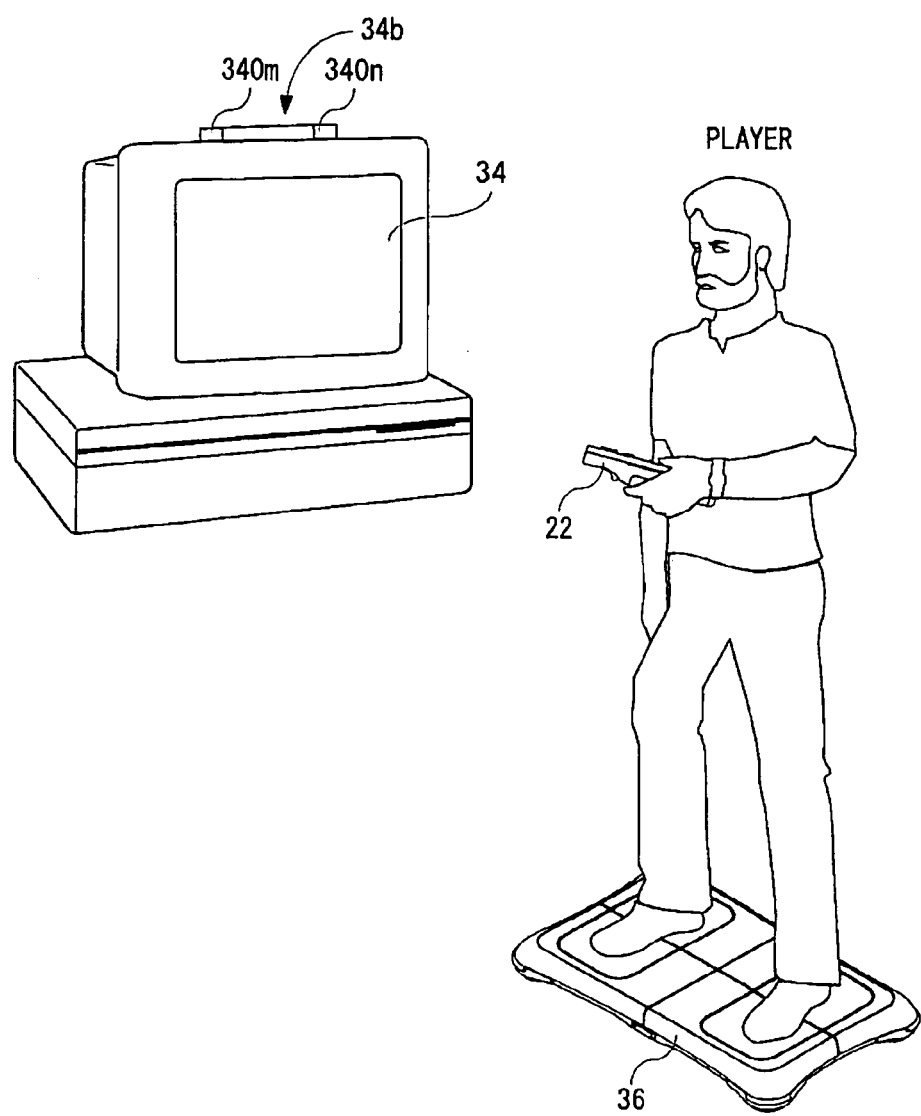
FIG. 8 is an illustrative view roughly explaining a state when a game is played by using the controller and the load controller.

FIG. 8 is an illustrative view roughly explaining a state in which the game is played using the controller 22 and load controller 36. As shown in FIG. 8, when playing a game by utilizing the controller 22 and the load controller 36 in the video game system 10, the player grasps the controller 22 in one hand while riding on the load controller 36. Exactly, the player grasps the controller 22 with the front-end surface (the side of the incident port 22d to which the light imaged by the imaged information arithmetic section 80 is incident) of the controller 22 orientated toward the markers 340m and 340n while riding on the load controller 36. However, as can be seen from FIG. 1, the markers 340m and 340n are disposed in parallel with the crosswise direction of the screen of the monitor 34. In this state of things, the player changes the position on the screen indicated by the controller 22 or the distance between the controller 22 and the marker 340m or 340n to perform the game manipulation.

Additionally, although FIG. 8 shows that by placing the load controller 36 vertically to the screen of the monitor 34 (placing it such that the direction of the long side is vertical to the screen), the player is transverse to the screen, a position of the load controller 36 and a direction of the player with respect to the screen may arbitrarily be changed depending on the kind of the game, and by placing (by placing it such that the long side direction is parallel with the screen) the load controller 36 horizontally to the screen, the player may be oriented to face with the screen, for example.

Figure 9:
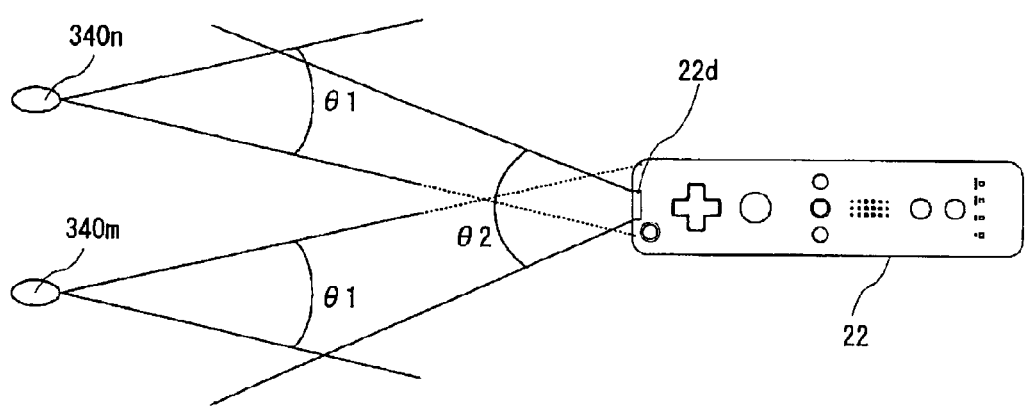
FIG. 9 is an illustrative view showing viewing angles of markers and the controller shown in FIG. 1.

FIG. 9 is an illustrative view for explaining view angles of the markers 340m and 340n and controller 22. As shown in FIG. 9, the markers 340m and 340n each emit the infrared ray in a range of a view angle $\theta 1$. The imager 80c of the imaged information arithmetic section 80 can receive the incident light in a range of a view angle $\theta 2$ around a visual axis direction of the controller 22. For example, each of the markers 340m and 340n has the view angle $\theta 1$ of 34° (half-value angle), and the imager 80c has the view angle $\theta 2$ of 41°. The player grasps the controller 22 such that the imager 80c is set to the position and orientation at which the infrared rays can be received from the two markers 340m and 340n. Specifically, the player grasps the controller 22 such that at least one of the markers 340m and 340n exists in the view angle $\theta 2$ of the imager 80c while the controller 22 exists in the view angle $\theta 1$ of at least one of the markers 340m and 340n. In this state, the controller 22 can detect at least one of the markers 340m and 340n. The player can change the position and orientation of the controller 22 to perform the game manipulation in the range satisfying this state.

In the case where the position and orientation of the controller 22 are out of the range, the game manipulation cannot be performed based on the position and orientation of the controller 22. Hereinafter the range is referred to as "manipulable range".

Figure 10:
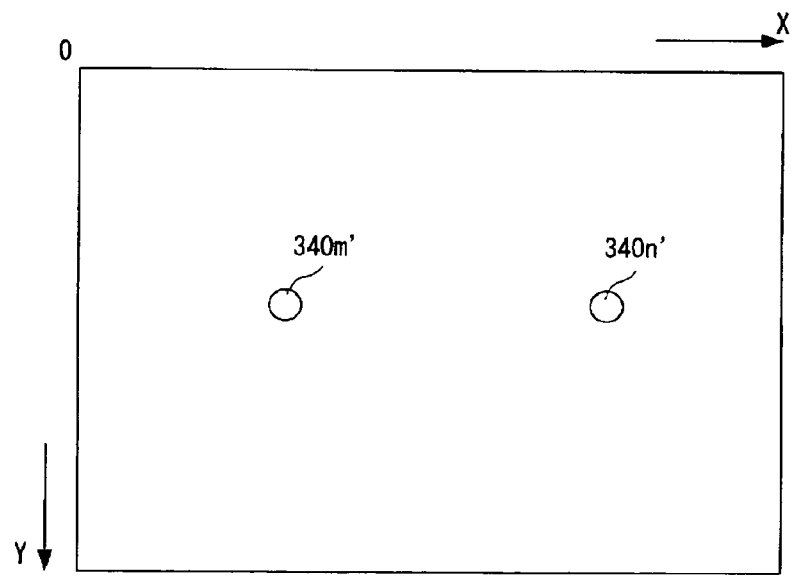
FIG. 10 is an illustrative view showing one example of an imaged image including target images.

In the case where the controller 22 is grasped in the manipulable range, the images of the markers 340m and 340n are taken by the imaged information arithmetic section 80. That is, the imaged image obtained by the imager 80c includes the images (target images) of the markers 340m and 340n that are of the imaging target. FIG. 10 is a view showing an example of the imaged image including the target image. Using the image data of the imaged image including the target image, the image processing circuit 80d computes the coordinate (marker coordinate) indicating the position in the imaged images of the markers 340m and 340n.

Because the target image appears as a high-brightness portion in the image data of the imaged image, the image processing circuit 80d detects the high-brightness portion as a candidate of the target image. Then, the image processing circuit 80d determines whether or not the high-brightness portion is the target image based on the size of the detected high-brightness portion. Sometimes the imaged image includes not only images 340m' and 340n' corresponding to the two markers 340m and 340n that are of the target image but also the image except for the target image due to the sunlight from a window or a fluorescent light. The processing of the determination whether or not the high-brightness portion is the target image is performed in order to distinguish the images 340m' and 340n' of the makers 340m and 340n that are of the target image from other images to exactly detect the target image. Specifically, the determination whether or not the detected high-brightness portion has the size within a predetermined range is made in the determination processing. When the high-brightness portion has the size within the predetermined range, it is determined that the high-brightness portion indicates the target image. On the contrary, when the high-brightness portion does not have the size within the predetermined range, it is determined that the high-brightness portion indicates the image except for the target image.

Then, the image processing circuit 80d computes the position of the high-brightness portion for the high-brightness portion in which it is determined indicate the target image as a result of the determination processing. Specifically, a position of the center of gravity of the high-brightness portion is computed. Hereinafter, the coordinate of the position of the center of gravity is referred to as marker coordinate. The position of the center of gravity can be computed in more detail compared with resolution of the imager 80c. At this point, it is assumed that the image taken by the imager 80c has the resolution of 126×96 and the position of the center of gravity is computed in a scale of 1024×768. That is, the marker coordinate is expressed by an integer number of (0, 0) to (1024, 768).

The position in the imaged image is expressed by a coordinate system (XY-coordinate system) in which an origin is set to an upper left of the imaged image, a downward direction is set to a positive Y-axis direction, and a rightward direction is set to a positive X-axis direction.

In the case where the target image is correctly detected, two marker coordinates are computed because the two high-brightness portions are determined as the target image by the determination processing. The image processing circuit 80d outputs the pieces of data indicating the two computed marker coordinates. As described above, the outputted pieces of marker coordinate data are added to the input data by the processor 70 and transmitted to the game apparatus 12.

When the game apparatus 12 (CPU 40) detects the marker coordinate data from the received input data, the game apparatus 12 can compute the position (indicated coordinate) indicated by the controller 22 on the screen of the monitor 34 and the distances between the controller 22 and the markers 340*m* and 340*n* based on the marker coordinate data. Specifically, the position toward which the controller 22 is orientated, i.e., the indicated position is computed from the position at the midpoint of the two marker coordinates. Accordingly, the controller 22 functions as a pointing device for instructing an arbitrary position within the screen of the monitor 34. The distance between the target images in the imaged image is changed according to the distances between the controller 22 and the markers 340*m* and 340*n*, and therefore, by computing the distance between the marker coordinates, the game apparatus 12 can compute the current distances between the controller 22 and the markers 340*m* and 340*n*.

In the game system 10, a game is performed by a motion such as putting a foot on and down from the load controller 36 by the player. The motion performed on the load controller 36 by the player is determined (identified) on the basis of the load values detected by the load controller 36. Specifically, on the basis of a ratio of the load values to a body weight value of the player and a position of the center of gravity, a motion performed on the load controller 36 by the player is determined. More specifically, on the basis of the ratio of the detected load values to the body weight value and the position of the center of gravity, which motion is performed can be specified out of a plurality of motions set (registered) in advance. Furthermore, whether or not a predetermined motion is performed can be determined on the basis of the ratio of the detected load values to the body weight value and the position of the center of gravity.

In this embodiment, a step-up-and-down exercise game is performed. The step-up-and-down exercise is an exercise of repetitively stepping up and down the board. As shown in FIG. 11, the player plays the game by performing a motion of putting the foot on and down from the load controller 36 while regarding the load controller 36 as a stepping board.

FIG. 11 shows a case that the player performs a step-up-and-down exercise from the right foot on the load controller 36 placed in front of him or her as one example. More specifically, as a first step (FIG. 11(A)), the right foot is put on, as a second step (FIG. 11(B)), the left foot is put on, as a third step (FIG. 11(C)), the right foot is put down backward, and as a fourth step (FIG. 11(D)), the left foot is put down backward.

The motion of stepping up and down the load controller 36 is according to an instruction on the game screen described below, and can be changed as necessary. Accordingly, FIG. 11 shows that the stepping up and down exercise starts from the right foot, but the exercise may start from the left foot. Furthermore, FIG. 11 shows that the player first puts down the foot which has formerly been ridden, but the player may first put down the foot which has later been ridden. In FIG. 11, the player steps up and down while moving forward and backward. Alternatively, the player may step up and down while moving from side to side, or may step up and down while moving backward and forward, and from side to side in combination.

Furthermore, a step-up-and-down exercise including a thigh lifting motion is also performed. FIG. 12 shows a motion of the player in a case that a thigh lifting motion is included in the step-up-and-down exercise shown in FIG. 11.

More specifically, at a first step (FIG. 12(A)), the right foot of the player is put on the load controller 36 similar to the normal step-up-and-down exercise in FIG. 11. Next, at a second step (FIG. 12(B)), a lifting the left thigh is performed. That is, the player lifts the left foot and lifts the left knee by swinging the left thigh when riding on the load controller 36. The player stands with only the right foot without the left foot being put on the load controller 36. Next, at a third step (FIG. 12(C)), the swung left foot is put down backward, and at a fourth step (FIG. 12(D)), the right foot is put down backward.

In this embodiment, each of the motions in such a step-up-and-down exercise, that is, each of the motions at the first step, at the second step, at the third step and at the fourth step is determined on the basis of the load values.

More specifically, inventors find that a motion performed on the load controller 36 by the player can be determined by deciding a ratio of the load values to the body weight value by the player and a position of the center of gravity in combination.

The body weight value is calculated by summing load values of all the load sensors 36*b* detected when the player rides on the load controller 36 in a still state. Additionally, when the body weight value is measured, a screen for instructing the player to calmly ride on the load controller 36 with both feet is displayed, for example. A ratio of the load values to the body weight value is calculated by dividing the sum of the detected load values of all the load sensors 36*b* by the body weight value.

The position of the center of gravity is a position of the center of gravity of the load values of the respective load sensors 36*b* of the load controller 36. In this embodiment, the step-up-and-down exercise is performed such that the long side of the rectangular board 36*a* of the load controller 36 positions in a back-and-forth direction of the player, and the short side positions in a right and left direction of the player. Then, the position of the center of gravity in the right and left direction is utilized for identifying a motion.

When a load value detected by the load sensor 36*b* at the left front of the player is a, when a load value detected by the load sensor 36*b* at the left back is b, when a load value detected by the load sensor 36*b* at the right front is c, when a load value detected by the load sensor 36*b* at the right back is d, the position of the center of gravity in the right and left direction XG is calculated by Equation 1 below.

$$XG=((c+d)-(a+b))*m \quad \text{[Equation 1]}$$

Here, m is a constant, and set to a value satisfying $-1 \leq XG \leq 1$.

Additionally, although not utilized in this embodiment, in another embodiment, judgment may be performed on the basis of a position of the center of gravity in a back and forth direction depending on the motion. In this case, the position of the center of gravity in a back and forth direction YG is calculated by a following Equation 2.

$$YG=((a+c)-(b+d))*n \quad \text{[Equation 2]}$$

Here, n is a constant, and set to a value satisfying $-1 \leq YG \leq 1$.

Thus, the position of the center of gravity in a right and left direction XG is calculated on the basis of the difference between the load values (c+d) at the right of the player and the load values (a+b) at the left of the player, and the position of the center of gravity in a back-and-forth direction YG is calculated on the basis of the difference between the load values (a+c) in front of the player and the load values (b+d) at the rear of the player.

It should be noted toward which direction (right front, right back, left front, left back in this embodiment) each load sensor 36b exists when viewed from the player can be grasped from the arrangement data which is decided in advance or set by the player so as to be stored as described above.

In FIG. 13, for each motion determined in this embodiment, a condition in relation to a ratio of load values to a body weight value, and a condition in relation to a position of center of gravity are shown. A table in which a condition relating to the ratio and a condition relating to the position of the center of gravity are brought into correspondence with identification information of predetermined number of motions is stored in advance.

More specifically, the right foot riding motion is a motion of putting the right foot on the load controller 36 with the left foot put on the ground as shown in FIG. 11(A), FIG. 12(A) and FIG. 12(C). The condition of the ratio of the load values is 25 to 75%. According to this motion, one foot is put on the load controller 36, the other foot remains to be put on the ground, so that the half of all the player's weight is put on the load controller 36. In addition, a condition of the ratio of the load values for each motion is decided in view of the difference of the balance of the loads put on the right and left feet due to a habit for each player, etc.

Furthermore, the condition of the position of the center of gravity is +0.01 to +1.0. In the step-up-and-down exercise of this embodiment, the player is required to put the right foot nearer to the right side than the center of the board 36a of the load controller 36, and put the left foot nearer to the left side than the center of the board 36a, so that the condition of a position of the center of gravity for each motion is set by taking this into consideration. That is, when only the right foot is put on the load controller 36, the position of the center of gravity appears on the right side of the load controller 36, when only the left foot is put on the load controller 36, the position of the center of gravity appears on the left side of the load controller 36, and when both of the feet are put on, the position of the center of gravity appears at approximately the center. In addition, in view of a difference in the positions of the center of gravity due to a habit for each player, a condition of the position of the center of gravity for each motion is decided.

A both feet riding motion is a motion to bring about a state that both of the feet are put on the load controller 36 as shown in FIG. 11(B). The condition of the ratio is equal to or more than 95% (almost all the player's weight), and the condition of the position of the center of gravity is −0.7 to +0.7.

A left foot riding motion is opposite to the right foot riding motion, and is a motion to bring about a state that the left foot is put on the load controller 36 while the right foot is put down on the ground as shown in FIG. 11(C). The condition of the ratio is 25 to 75%, and the condition of the position of the center of gravity is −1.0 to −0.01.

A left thigh lifting motion is a motion to bring about a state that the right foot is put on the load controller 36 while the left thigh is lifted as shown in FIG. 12(B). The condition of the ratio is equal to or more than 100%, and the condition of the position of the center of gravity is +0.01 to +1.0. When the left thigh is swung up on the load controller 36, the right foot is depressed. Thus, a load more than all the player's body weigh is put on the right foot, so that a load value larger than that when both feet are merely put on the load controller 36, that is, a load value larger than the body weight value is detected. This makes it possible to discriminate a motion of merely putting one foot or both feet from a thigh lifting motion.

The right thigh lifting motion is reverse to the left thigh lifting motion, and is a motion to bring about a state that the left foot is put on the load controller 36 while the right thigh is lifted. The condition of the ratio is equal to or more than 100%, and the condition of the position of the center of gravity is −1.0 to −0.01.

A both feet putting down motion is a motion to bring about a state that both of the feet are put on the ground as shown in FIG. 11(D) and FIG. 12(D). The condition of the ratio is equal to or less than 5% (approximately zero). Since both of the feet are not put on the load controller 36, the load becomes approximately zero. Accordingly, a position of the center of gravity is not considered.

By calculating the ratio of the load values to the body weight value and the position of the center of gravity, and then referring to the motion identifying condition table, which motion is performed can be specified out of the plurality of motions registered in advance.

It should be noted that the numerical values shown in FIG. 13 are one example and can be changed as necessary. As described above, differences occur in the ratio of the load values and the position of the center of gravity due to a habit by the player, etc. Thus, before actually doing the exercise, the player has a measurement test, etc. of each motion to thereby allow an adjustment of a condition value for each player.

Figure 14:
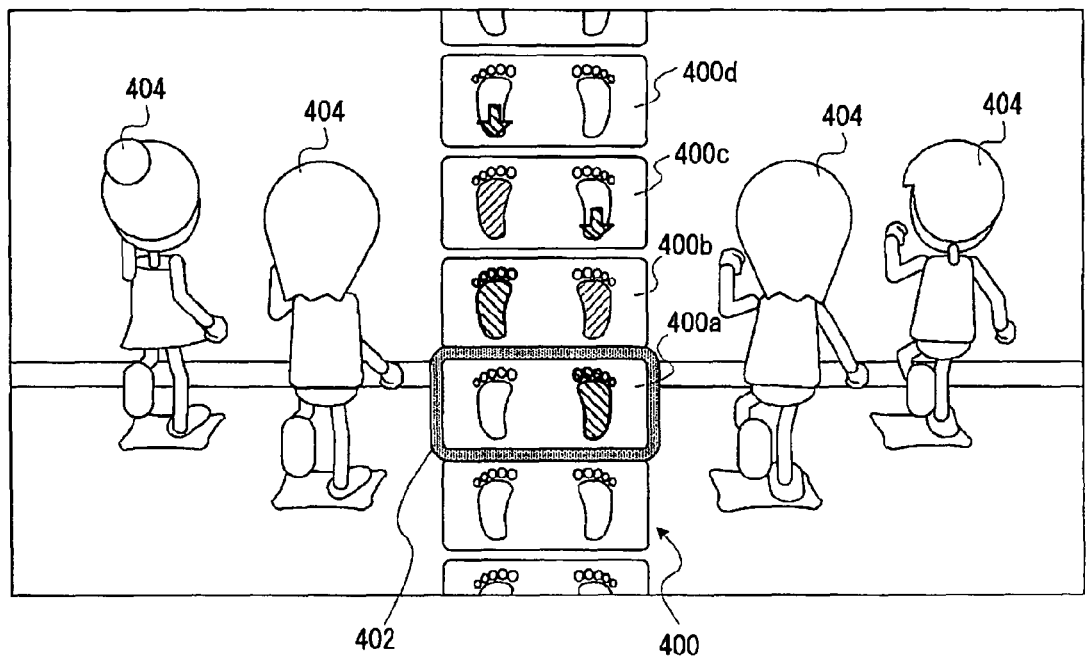
FIG. 14 is an illustrative view showing one example of a game screen.

FIG. 14 shows one example of the game screen. At the center in the horizontal direction of the screen, a plurality of panels 400 for instructing the player how to move are displayed. Each panel 400 shows a part of motion making up of the motions of the step-up-and-down exercise in this embodiment. The arrangement of the plurality (four in this embodiment) of panels 400 in a predetermined order can inform the motion to be executed by the player in the step-up-and-down exercise as a series of motions.

More specifically, in each panel 400, two right and left foot prints are drawn, and by changing a color, a shape, a pattern, etc. of the foot prints, a stepping up and down motion to be performed by the right and left feet is represented. Additionally, as a basic manner of the panel 400, a base color is drawn in white, and a line of the foot prints is drawn in gray, for example. If no motion is required to be executed, the panel 400 in this basic manner is used.

In FIG. 14, a series of motions of the step-up-and-down exercise shown in FIG. 11 is instructed by four panels 400a-400d. The panel 400a is a panel for instructing the player to put a right foot on as a first step as shown in FIG. 11(A). For example, the foot print of the right foot is represented in red to show that the right foot is ridden from a state that no foot is ridden. The panel 400b is a panel for instructing the player to put the left foot on as a second step as shown in FIG. 11(B). For example, the left foot print is colored red, and the red of the right foot print is paled. This shows that the left step is further ridden from the state that the right foot is ridden. The panel 400c is a panel for instructing the player to put the right foot down as a third step as shown in FIG. 11(C). For example, the red of the left foot print is paled, and a red down arrow is drawn on the right foot print. This shows that the right foot is put down rearward from a state that both of the feet are ridden. The panel 400d is a panel for instructing the player to put the left foot down as a fourth step as shown in FIG. 11(D). For example, a red down arrow is drawn on the left foot print. This shows that the left foot is put down rearward in a state that the left foot is ridden.

Each panel 400 is constructed so as to sequentially appear from the upper end of the screen, move down, and disappear to the lower end of the screen. At a predetermined position below the center of the screen, a frame 402 is fixedly arranged. The frame 402 is provided on the moving path of the panels 400, and the panel 400 is stopped within the frame 402 for a set amount of time. The frame 402 can show the panel 400 to currently be executed. The panel 400 moving into the position of the frame 402 out of the plurality of panels 400 indicates a motion to be currently executed.

In addition, on the screen, a plurality of characters 404 are displayed at the right and left of the panel 400, for example. These characters 404 are controlled so as to make their motions according to the instruction by the panel 400 and the frame 402. In FIG. 14, since the panel 400a moves into the frame 402, each of the characters 404 performs a motion of putting the right foot on the board. By the action of each of the characters 404, it is possible to confirm the motion instructed on the panel 400.

In the game apparatus 12, from the load values detected by the load controller 36, a ratio of the load values to the body weight value and a position of the center of gravity are calculated, and on the basis of the motion identifying condition table shown in FIG. 13 described above, which motion is performed is specified out of the plurality of registered motions. Then, whether or not the specified motion is a motion to be currently executed which is instructed by the frame 402 is determined. If it is decided that a motion according to the instruction is performed, a score is given to the player.

Figure 15:
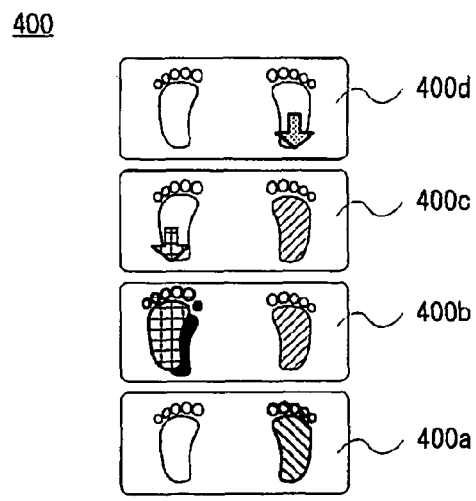
FIG. 15 is an illustrative view showing one example of panels for instructing a motion of the step-up-and-down exercise incorporating a thigh lifting motion in FIG. 12.

Additionally, in a case that the step-up-and-down exercise including a thigh lifting motion is instructed, a panel 400 shown in FIG. 15 is displayed. On the panel 400, a step-up-and-down exercise including a left thigh lifting motion shown in FIG. 12 is instructed. Since red is utilized in the motion of the above-described normal step-up-and-down exercise, a different color such as green is utilized for a motion of lifting a thigh. More specifically, the panel 400b at the second step is for instructing to lift the left thigh, and the color of the left foot print is made green, for example. In addition, in order to show that the foot is completely lifted, the left foot print is shaded. Furthermore, the panel 400c at the third step is for instructing a motion of putting the lifted left thigh down, and a green down arrow is drawn on the left foot print, for example. Additionally, the panel 400a at the first step is the same as the panel 400a at the first step of the normal step-up-and-down exercise shown in FIG. 14 and is for instructing a motion of putting the right foot on, and the right foot print is shown by red. Furthermore, the panel 400d at the fourth step is for instructing to put the right foot down, and a red down arrows is drawn on the right foot print.

Furthermore, on the game screen in FIG. 14, the player is instructed to execute the step-up-and-down exercise in FIG. 11. However, in the game apparatus 12, on the basis of the motion identifying condition table shown in FIG. 13, it is possible to specify which motion is performed out of the predetermined number of motions. Accordingly, not only either of the panel 400 (FIG. 14) for instructing the normal step-up-and-down exercise in FIG. 11 and a panel 400 (FIG. 15) for instructing a step-up-and-down exercise including a thigh lifting motion in FIG. 12 is displayed on the screen to thereby allow the player to perform the only displayed step-up-and-down exercise, but also both of the panels may simultaneously be displayed, for example, to allow the player to perform a favorable step-up-and-down exercise. In general, there are differences in the motion at second step and the motion at the third step between the step-up-and-down exercise and the step-up-and-down exercise including a thigh lifting motion. However, load values of the load controller 36 are detected, and a ratio of the detected load values to the body weight value and a position of the center of gravity are calculated. Then, by making a determination on the basis of the calculated ratio and the position of the center of gravity, it is possible to determine which motion is performed as to the motion at the second step and the motion at the third step. In this case, since each motion can be specified, by storing the history of the specified motions, it is possible to specify a series of motions performed by the player. For example, whether the normal step-up-and-down exercise or the step-up-and-down exercise including a thigh lifting motion can be specified, and whether a stepping up and down exercise started from the right foot or the left foot can also be specified.

In order to specify a motion on the basis of the motion identifying condition table shown in FIG. 13 with accuracy, in an instruction of a motion on the screen as shown in FIG. 14, timing suitable for executing each motion is shown in this embodiment. Then, according to the timing, load values are detected for motion identification.

Figure 16:
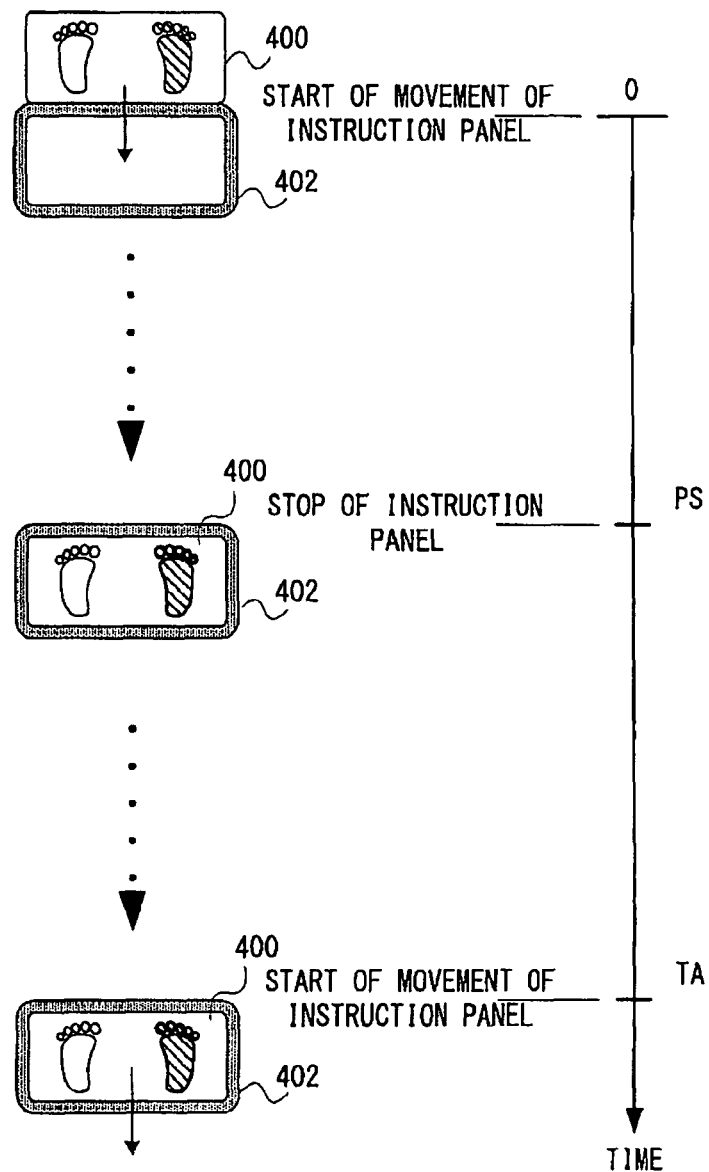
FIG. 16 is an illustrative view showing a movement of instruction panels.

More specifically, timing of a motion is shown by a state of the movement of the panel 400 as shown in FIG. 16. As described above, the plurality of panels 400 are controlled so as to move from top to bottom in a predetermined alignment on the screen, and stop within the frame 402 for a set amount of time, so that a panel 400 moving from top stops for a set amount of time in a state that it is adjacent to the frame 402, and then starts moving into the frame 402.

Then, the panel 400 is stopped within the frame 402 when a predetermined time PS elapses from the start of the movement, and then continues to be stopped until the predetermined time TA. After lapse of the predetermined time TA, the panel 400 starts to move again. By the movement, the panel 400 moves outside the frame 402 and the next panel 400 start to enter into the frame 402.

The provision of the stopping period to the movement of the panels can clearly show the player when an instruction of each motion is started and ended. The motion instructed to the player by the panel 400 is required to be executed from when the panel 400 stars entering into the frame 402 to when the panel 400 starts going out from the frame 402. Thus, a time limit is prepared for the judgment of the motion, and the time limit is decided to be a suitable value in advance as a success-or-failure judgment time TA. The success-or-failure judgment time (time limit) TA is set to a suitable value depending on how fast the player is made to perform the motion of stepping up and down, for example.

The panel stopping time PS is set to a proper value in advance by experiments, etc. so as to be timing suitable for a motion of stepping up and down, for example. For example, the timing when the foot moving for stepping up and down accurately touches the load controller 36 or the ground (floor) and the timing of starting to swing up the foot for lifting the thigh may be adopted. Thus, the player can perform a motion according to the moving state of the panels 400 such that he or she puts the foot down and on another place while the panels 400 move, and completely puts the foot on to finish the motion and adjusts a posture in order to prepare for a next motion while the panels 400 stop, or he or she moves the body to the load controller 36 to prepare for a thigh lifting motion while the panels 400 move and finishes the thigh lifting motion while the panels 400 stop.

Then, an identification of the motion is performed from when a preset time, that is, the panel stopping time PS elapses from the start of the movement. This makes it possible to detect load values when the player finishes the motion, and identify the motion on the basis of appropriate load values capable of enhancing the accuracy of the identification.

If the motion is not specified until the time limit TA expires, if the specified motion is not the instructed motion, and so forth, it is decided that the execution of the instructed motion fails. If it is a failure judgment, the player is not scored.

On the other hand, if it is decided that the instructed motion is performed by the time when the time limit TA expires, it is decided that the execution of the instructed motion succeeds, and the player is scored.

Figure 17:
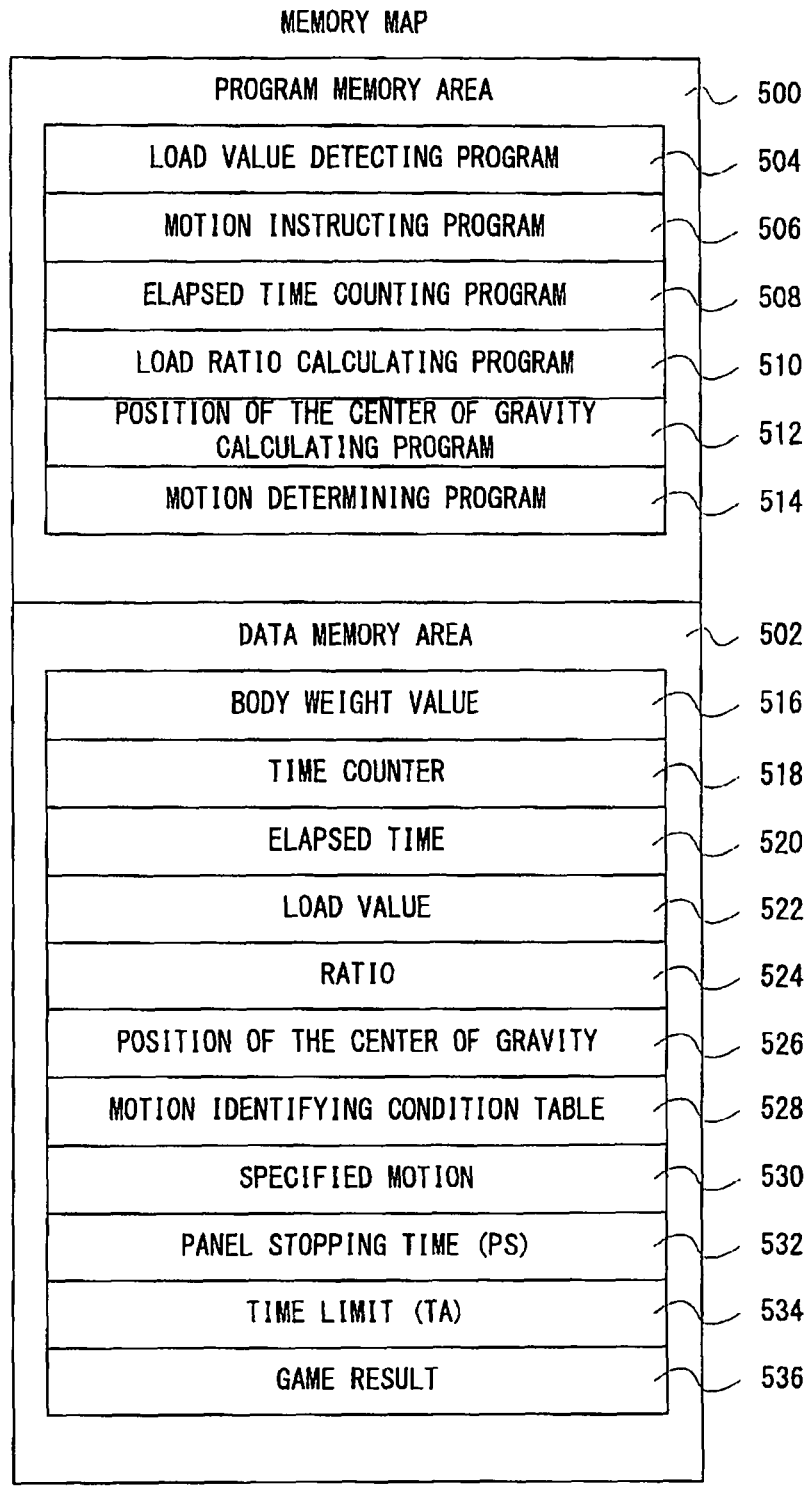
FIG. 17 is an illustrative view showing a memory map of the game apparatus.

FIG. 17 shows one example of a memory map of the game apparatus 12. The memory map includes a program memory area 500 and a data memory area 502. The program and the data are read from the optical disk 18 entirely at a time, or partially and sequentially as necessary so as to be stored into the external main memory 46 or the internal main memory 42e. Furthermore, in the data memory area 502, data generated or fetched by the processing is also stored. The program is a load detecting program for making the game system 10 function as a load detecting apparatus.

FIG. 17 shows only a part of the memory map, and other programs and data necessary for processing are also stored. For example, sound data for outputting a sound such as a voice, a sound effect, music, etc., image data for generating a screen, a sound output program, an image generating and displaying program, etc. are read from the optical disk 18, and stored in the data memory area 502 or the program memory area 500. It should be noted that in this embodiment, the program and the data are read from the optical disk 18, but in another embodiment, a program and data stored in advance in a nonvolatile storage medium such as the flash memory 44, etc. incorporated in the game apparatus 12 may be read so as to be stored in the external main memory 46 or the internal main memory 42e. At this time, a program, etc. downloaded via a network by utilizing the wireless communication module 50 of the game apparatus 12 or a communication module connected to the expansion connector 60 of the game apparatus 12 may be stored in the storage medium.

A memory area 504 stores a load value detecting program. The program is for detecting load values of the load controller 36. For example, when a load is required, a load obtaining command is transmitted to the load controller 36 via the wireless controller module 52, and load values of the respective load sensors 36b are detected from the data of the load controller 36 received in the radio controller module 52. At a time of a judgment of the motion, load values are fetched at an interval of a constant period, such as one frame (1/60 seconds), for example.

A memory area 506 stores a motion instructing program. The program is for instructing a player of a motion to be executed. The movements and stops of the plurality of panels 400 for instructing a series of motions are controlled on the basis of the time limit TA and the panel stopping time PS as described above.

A memory area 508 stores an elapsed time counting program. The program is for counting the time elapsed from when an instruction of a motion is given. More specifically, the time when a panel 400 starts to move from the position upwardly adjacent to the frame 402 into the frame 402 is the time when the motion corresponding to the panel 400 is instructed, and therefore, the time is counted from when the panel 400 starts to move into the frame 402.

A memory area 510 stores a load ratio calculating program. The program is for calculating a ratio of detected load values to a body weight value. The load values of the respective load sensors 36b are sum up, and by dividing the total value with the body weight value, the ratio is calculated.

A memory area 512 stores a position of the center of gravity calculating program. The program is for calculating a position of the center of gravity of the detected load values. The position of the center of gravity is calculated according to Equation 1 or Equation 2 described above.

A memory area 514 stores a motion determining program. The program is for specifying which motion is performed out of the predetermined number of motions on the basis of the calculated ratio of the load values, the position of the center of gravity, and a motion identifying table.

A memory area 516 of the data memory area 502 stores a body weight value of the player. The body weight value is calculated by summing load values of all the load sensors 36b detected when the player rides on the load controller 36 in a still state. Additionally, when the body weight value is measured, a screen for instructing the player to calmly ride on the load controller 36 with both feet is displayed.

A memory area 518 stores a time counter. The time counter is a counter for counting an elapsed time from when an instruction of each motion is given. In this embodiment, the count is performed at an interval of a preset time (1 frame).

A memory area 520 stores an elapsed time counted by the elapsed time counting program. An elapsed time from an instruction of each motion of the step-up-and-down exercise is calculated on the basis of the value of the time counter and stored.

A memory area 522 stores load values of the respective load sensors 36b detected by the load detecting program.

A memory area 524 stores a ratio of load values to a body weight value calculated by the load ratio calculating program. A memory area 526 stores a position of the center of gravity calculated by the position of the center of gravity calculating program.

A memory area 528 stores a motion identifying condition table read from the optical disk 18, etc. The motion identifying condition table stores conditions for determining a predetermined number of motions as shown in FIG. 13. More specifically, each of the conditions of the ratio of the load values to the body weight value and each of the conditions relating to the position of the center of gravity are brought into correspondence with identification information of each motion. When a motion determination is made, with reference to the table, a motion satisfying the both conditions of the ratio and the position of the center of gravity is detected to thereby specify the motion performed by the player.

A memory area 530 stores identification information of a motion specified by the motion determining program. Here, in a case that no motion can be specified, data indicating impossibility of specification is stored.

A memory area 532 stores a panel stopping time PS indicating a time during which the instruction panel 400 is stopped. A memory area 534 stores a time limit TA for determining a motion to be currently executed. The panel stopping time PS and the time limit TA are read from the optical disk 18.

A memory area 536 stores a result of the game. As a game result, a score of the player, an evaluation (OK or failure), etc. of the respective motions are stored.

Figure 18:
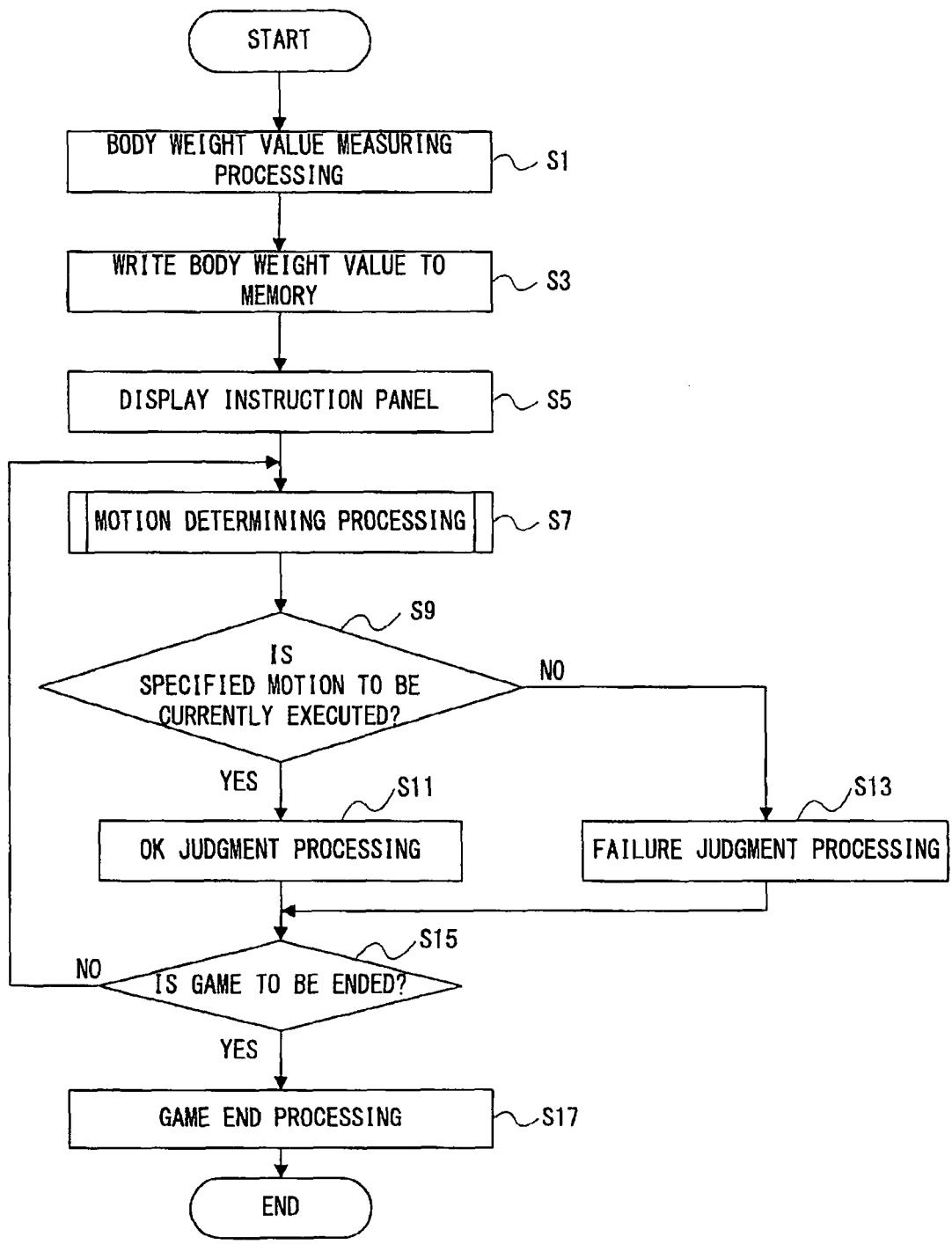
FIG. 18 is a flowchart showing one example of an operation of the game apparatus.

FIG. 18 shows one example of a motion of the game apparatus 12 when a step-up-and-down exercise is executed. In a step S1, the CPU 40 executes body weight value measuring processing. Load values of the respective load sensors 36b when the player rides on the load controller 36 in a still state are detected. More specifically, the CPU 40 transmits a load obtaining command to the load controller 36 via the wireless controller module 52, etc. In response thereto, the microcomputer 100 of the load controller 36 detects load values of the respective load sensors 36b, and transmits input data including the respective load values to the game apparatus 12 via the wireless module 106, etc. The CPU 40 receives the input data including the respective load values via the wireless controller module 52, etc., and detects the respective load values so as to store the same in the memory area 522. Then, a body weight value is calculated by summing all the load values of all the load sensors 36b. Additionally, a screen for instructing the player to ride on the load controller 36 with both feet may be displayed on the monitor 34.

In a succeeding step S3, the CPU 40 writes the body weight value to the external main memory 46. Thus, the body weight value of the player is stored in the memory area 516.

Then, in a step S5, the CPU 40 displays the instruction panels 400. More specifically, the CPU 40 generates a game screen shown in FIG. 14 including the instruction panels 400 by utilizing the GPU 42b, etc. of the system LSI 42 to display the same on the monitor 34. Here, as described above, each of the panels 400 for instructing each motion of the step-up-and-down exercise is displayed at a predetermined initial position at the top of the center of the screen in a predetermined order and downwardly moves toward the frame 402 while including constant stopped times. The control of the movement from the time when the motion of each panel 400 becomes a motion to be currently executed is started in the motion determination processing, and therefore, in the step S5, the processing is executed until the first instruction panel 400 is stopped upwardly adjacent to the frame 402.

Figure 19:
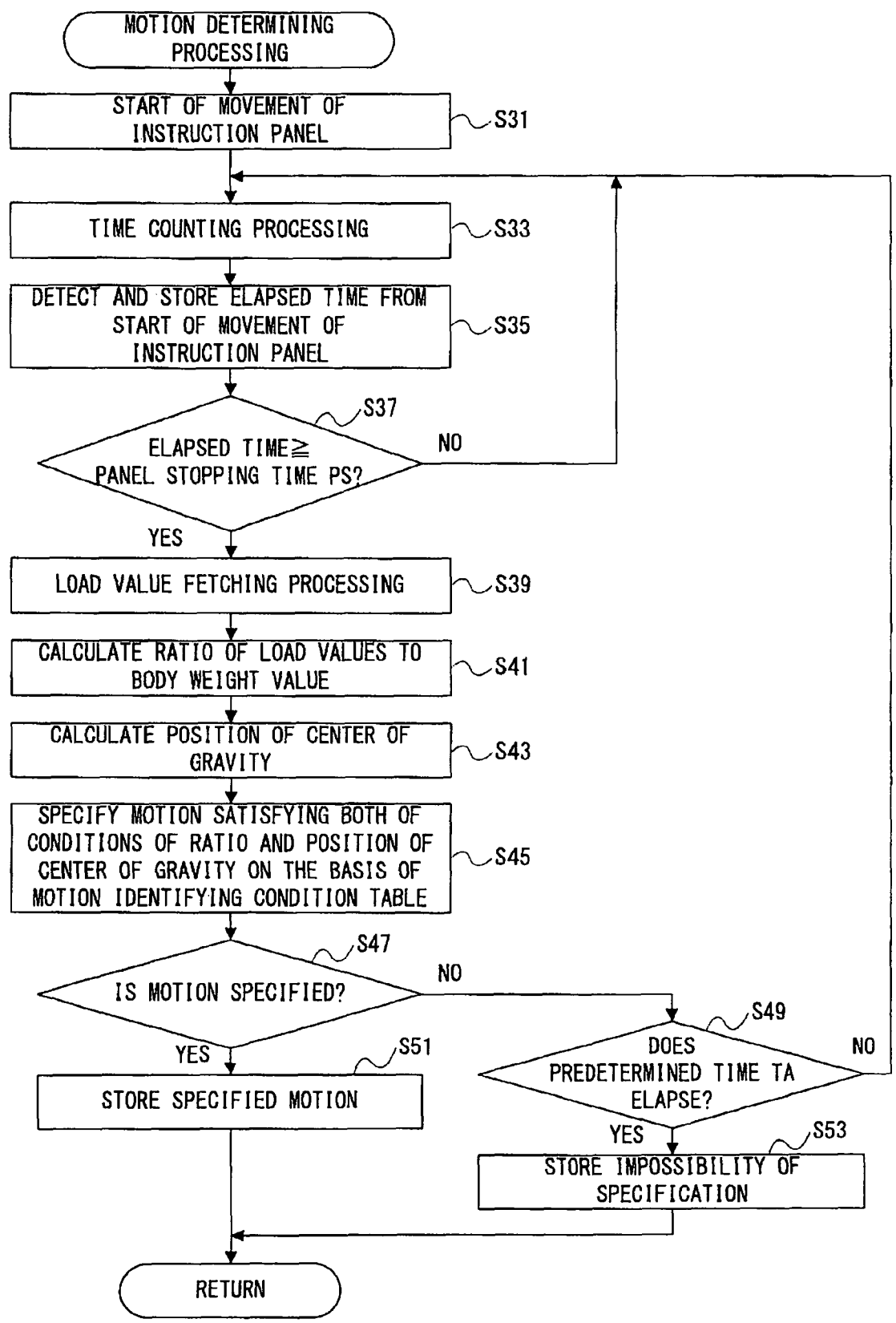
FIG. 19 is a flowchart showing one example of the motion determining processing shown in FIG. 18.

Succedingly, in a step S7, the CPU 40 executes motion determining processing. By the motion determining processing, a motion performed on the load controller 36 by the player is specified. FIG. 19 shows one example of an operation of the CPU 40 in the motion determining processing.

When starting the motion determining processing, the CPU 40 starts movement processing of the instruction panels 400 according to the motion instruction program in a step S31. The movement processing of the panels 400 started in the step S31 is executed in parallel with another processing in FIG. 19. By the movement processing of the panel 400, a panel 400 for instructing a motion to be currently executed moves from the position upwardly adjacent to the frame 402 into the frame 402. Here, at a start of the movement processing, a motion corresponding to the panel 400 at the position upwardly adjacent to the frame 402 is a motion to be currently executed. Although omitted in FIG. 19, before starting the movement processing, the panel 400 positioned upwardly adjacent to the frame 402 is detected by checking the coordinate data of the adjacent position stored in advance and coordinate data indicating a current position of each panel 400, and the identification information of the motion corresponding to the detected panel 400 is detected and stored as identification information of the motion to be currently executed. Furthermore, in the movement processing, as shown in FIG. 16, the panel 400 corresponding to the motion to be currently executed is controlled so as to enter into the frame 402 and stopped when a predetermined time PS elapses from the start of the movement and continue to be stopped within the frame 402 until the predetermined time TA elapses from the start of the movement.

The processing in succeeding steps S33-S49 are executed at a set intervals of times (one frame) until it is decided that a motion is specified in the step S47, or until it is decided that a motion is not performed within the time limit in the step S49.

In the step S33, the CPU 40 executes time counting processing. For example, by incrementing the time counter, the value of the time counter of the memory area 518 is updated. By the time counting processing, it is possible to count an elapsed time from when the motion instruction is given.

In the succeeding step S35, the CPU 40 detects an elapsed time from the start of the movement of the instruction panels 400 on the basis of the value of the time counter in the memory area 518 and stores the same in the memory area 520.

Then, in the step S37, the CPU 40 decides whether or not the elapsed time is equal to or more than the panel stopping time PS. That is, by utilizing the panel stopping time PS set to timing suitable for a motion of putting a foot on and down from the board, it is decided whether or not timing suitable for a determination of the motion has come. Thus, it is possible to prevent a determination of a motion from being performed on the basis of the load values detected before finish of the motion, for example, capable of enhancing accuracy of the identification. If "NO" in the step S37, the determination timing of the motion has not come, and therefore, the process returns to the step S33.

On the other hand, if "YES" in the step S37, that is, if it is decided that the determination timing of the motion has come, the CPU 40 executes load value fetching processing in the step S39. More specifically, the CPU 40 transmits a load obtaining command to the load controller 36 via the wireless controller module 52, etc. In response thereto, input data including the detected load values is transmitted from the load controller 36. Thus, The CPU 40 detects the load values of the respective load sensors 36b from the input data received by the wireless controller module 52, and stores the same in the memory area 522.

In the succeeding step S41, the CPU 40 calculates a ratio of the detected load values to the body weight value. More specifically, the load values of the respective load sensors 36b are summed, and the ratio of the total value to the body weight value is calculated so as to be stored in the memory area 524.

Furthermore, in the step S43, the CPU 40 calculates a position of the center of gravity. More specifically, a position of the center of gravity is calculated on the basis of the load values of the respective load sensors 36b according to the above-described Equation 1 so as to be stored in the memory area 526.

Then, in the step S45, the CPU 40 specifies a motion satisfying the both conditions of the ratio and the position of the center of gravity on the basis of the motion identifying condition table in the memory area 528. More specifically, a motion in which the ratio in the memory area 524 satisfies the condition of the ratio of the motion identifying condition table is detected, and a motion in which the position of the center of gravity of the memory area 526 satisfies the condition of the position of the center of gravity in the motion identifying condition table is detected. Then, the motion detected on the basis of both of the conditions is detected. It should be noted that the specifying processing may be performed on all the motions registered in the motion identifying condition table, or the specifying processing may be performed on the motions of the plurality of panels 400 displayed on the screen out of the motions registered in the motion identifying condition table.

Succedingly, in the step S47, the CPU 40 decides whether or not a motion is specified. If "NO" in the step S47, that is, if there is no motion satisfying both conditions of the ratio and the position of the center of gravity, the CPU 40 decides whether or not the predetermined time TA elapses with reference to the elapsed time in the memory area 520 in the step S49. If "NO" in the step S49, that is, if the elapsed time falls within the time limit TA, the process returns to the step S33.

On the other hand, if "YES" in the step S47, that is, if a motion satisfying both conditions of the ratio and the position of the center of gravity is detected, the CPU 40 stores identification information of the specified motion in the memory area 530 in a step S51.

Furthermore, if "YES" in the step S49, that is, if a motion is not specified even after a lapse of the time limit TA, the CPU 40 stores data indicating impossibility of specification in the memory area 530 in a step S53. After completion of the step S51 or the step S53, the motion determining processing is ended, and the process returns to the step S9 in FIG. 18.

In the step S9 in FIG. 18, the CPU 40 decides whether or not the specified motion is a motion to be currently executed. The motion to be currently executed is a motion instructed by the panel 400 located within the frame 402, and can be specified in the movement processing of the panels 400 which is started in the step S31 in FIG. 19 and executed in parallel therewith.

If "YES" in a step S9, that is, if the player makes the motion according to the instruction, the CPU 40 executes OK judgment processing in a step S11. More specifically, the player is given with predetermined scores, and this is added to the scoring data of the player in the game result memory area 536. Furthermore, the evaluation data indicating the OK judgment as to the motion to be currently executed is also stored in the memory area 536. Alternatively, the fact that the motion is OK may be displayed on the screen with letters of OK, etc. Further alternatively, a predetermined sound may be output from the speaker 34a to inform that a motion is a right motion according to the instruction.

On the other hand, if "NO" in the step S9, that is, if a motion different from the motion to be currently executed is specified or if no motion can be specified, the CPU 40 executes failure judgment processing in a step S13. More specifically, the player is not given with scores. Furthermore, evaluation data indicating the failure judgment as to the motion to be currently executed is stored in the game result memory area 536. In addition, a failure of the motion may be displayed on the screen by letters of FAILURE, etc.

In a step S15, the CPU 40 decides whether or not the game is to be ended. For example, it is decided whether or not the step-up-and-down exercise is performed for a predetermined time period or at a predetermined number of times. Or, it is decided whether or not execution of the instructed motion fails.

If "NO" in the step S15, the process returns to the step S7 to perform motion determining processing as to a next motion in the step-up-and-down exercise. Additionally, as shown in FIG. 16 described above, the instruction panel 400 stops when a predetermined time PS elapses from when it starts to move into the frame 402, and the instruction panel 400 starts to move outside the frame 402 when a further predetermined time TA elapses. At the same time, an instruction panel 400 of a next motion starts to move into the frame 402. That is, when the predetermined time TA elapses from when the previous panel 400 starts to move, the next panel 400 starts to move to thereby instruct the player to when to move. Thus, execution of the motion determining processing is waited until the predetermined time TA elapses from the start of the movement of the previous instruction panel 400.

On the other hand, in a case that it is decided that the game end condition is satisfied in the step S15, the CPU 40 executes game end processing in a step S17 to end the game processing of the step-up-and-down exercise. For example, the sum of the scores obtained by the successes of the respective motions of the step-up-and-down exercise is calculated, the score and a result of the evaluation corresponding to the score are displayed, and so forth.

According to this embodiment, on the basis of a ratio of the load values detected in the load controller 36 to the body weight value and a position of the center of gravity, which motion is performed out of the plurality of motions set in advance is specified, and therefore, it is possible to determine the motion of the player performed on the load controller 36.

Additionally, in the above-described embodiment, after an elapsed time from when an instruction of a motion is given is equal to or more than a predetermined time (panel stopping time PS), load values are detected. Thus, a motion can be identified with high accuracy on the basis of the load values detected at a proper timing. However, in another embodiment, without the processing in the step S37 being performed, load values are detected per unit of time (one frame, for example) from when an instruction of a motion is performed to when a predetermined time (time limit TA, for example) elapses. Then, on the basis of the load values detected every unit of time, a motion may be identified. For example, in a case of making detection for each frame, load values during when each motion has not been completed are also detected, but by defining an identification condition for each motion without overlapping, it is possible to accurately specify a motion. Furthermore, the determination may be performed on the basis of the plurality of load values detected for a predetermined time without the determination being performed for each detection. In this case, by identifying the plurality of load values synthetically, it is possible to ensure the accuracy of the determination.

Furthermore, in each of the above-described embodiments, a motion satisfying both of the condition of a ratio of load values to a body weight value and the condition of a position of the center of gravity is specified, and if it is decided that the motion is a motion to be currently executed (instructed motion), an OK judgment is performed. However, in another embodiment, whether or not an OK judgment is performed on a motion in the past, that is, whether or not the player properly performed the motion in the past may further be decided. In this case, depending on whether or not a motion is performed in the past by the player, it is possible to decide whether or not a current motion can be executed. For example, it is possible to appropriately determine a motion necessary for a success of the execution of the past motion, etc.

More specifically, if "YES" in the step S9, it is decided whether or not the evaluation data indicating the OK judgment is stored with reference to the game result data as to the past motion. If "YES", the OK judgment processing in the step S11 is performed while if "NO", the failure judgment processing in the step S13 is performed. For example, if the OK judgment is performed at least once or more out of the past three motions, the OK judgment is performed on the current motion while if the OK judgment is not performed once, the failure judgment may be decided. In a case of a motion constructing a series of motions such as the above-described step-up-and-down exercise, a fact that an OK judgment may be performed on at least one motion in the past, a predetermined motion or all the motions, etc. may be set as a condition. More specifically, in a case of the above-described step-up-and-down exercise, as to a motion at the fourth step of putting the foot down to bring about a state both of the feet are put down, the fact that the OK judgment is performed on any one of the motions at the first to third steps may be a condition of the OK judgment.

Furthermore, in each of the above-described embodiments, as an embodiment of a motion determination based on a ratio of the load values to the body weight value and a position of the center of gravity, which motion is executed out of the plurality of motions set in advance is specified on the basis of a ratio of load values to a body weight value and a position of the center of gravity. However, in another embodiment, whether or not a predetermined motion is performed may be determined on the basis of a ratio of load values to a body weight value and a position of the center of gravity. For example, in each of the above-described embodiments, as shown in FIG. 14, in order to show proper timing for the motion to be currently executed, the panels 400 and the frame 402 are displayed on the screen such that the movements and stops of the panels 400 are controlled. Thus, as to the motion corresponding to the panel 400 indicated by the frame 402, whether or not both of the condition of the ratio of the load values to the body weight value and the condition of the position of the center of gravity are satisfied may be determined. This makes it possible to determine whether or not the instructed motion is executed by the player.

Figure 20:
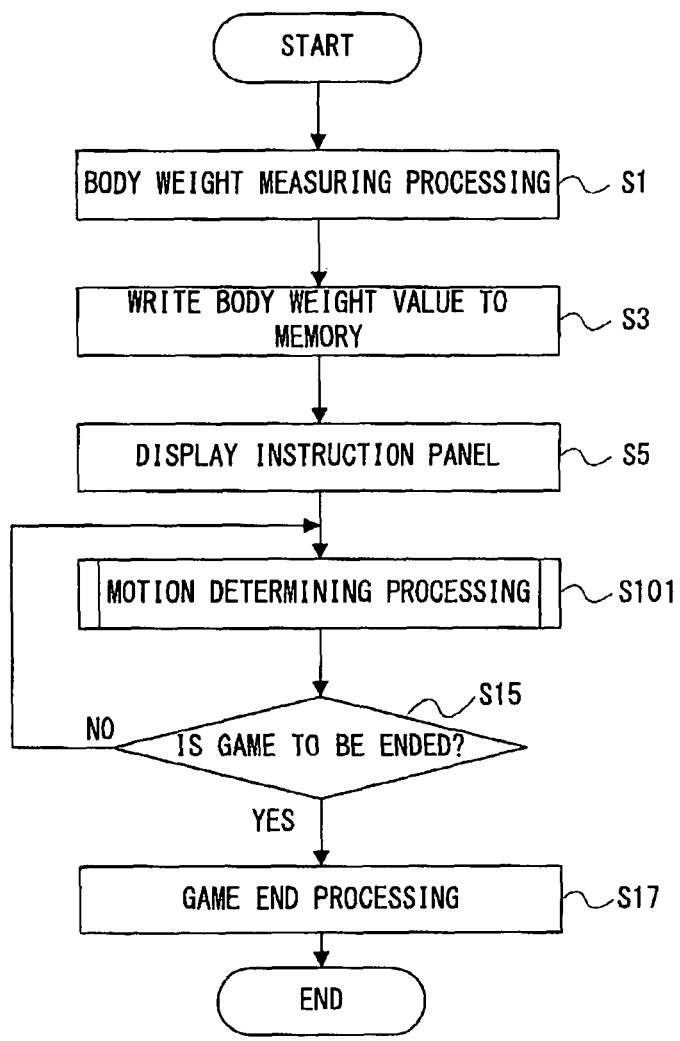
FIG. 20 is a flowchart showing one example of an operation of the game apparatus in another embodiment.
Figure 21:
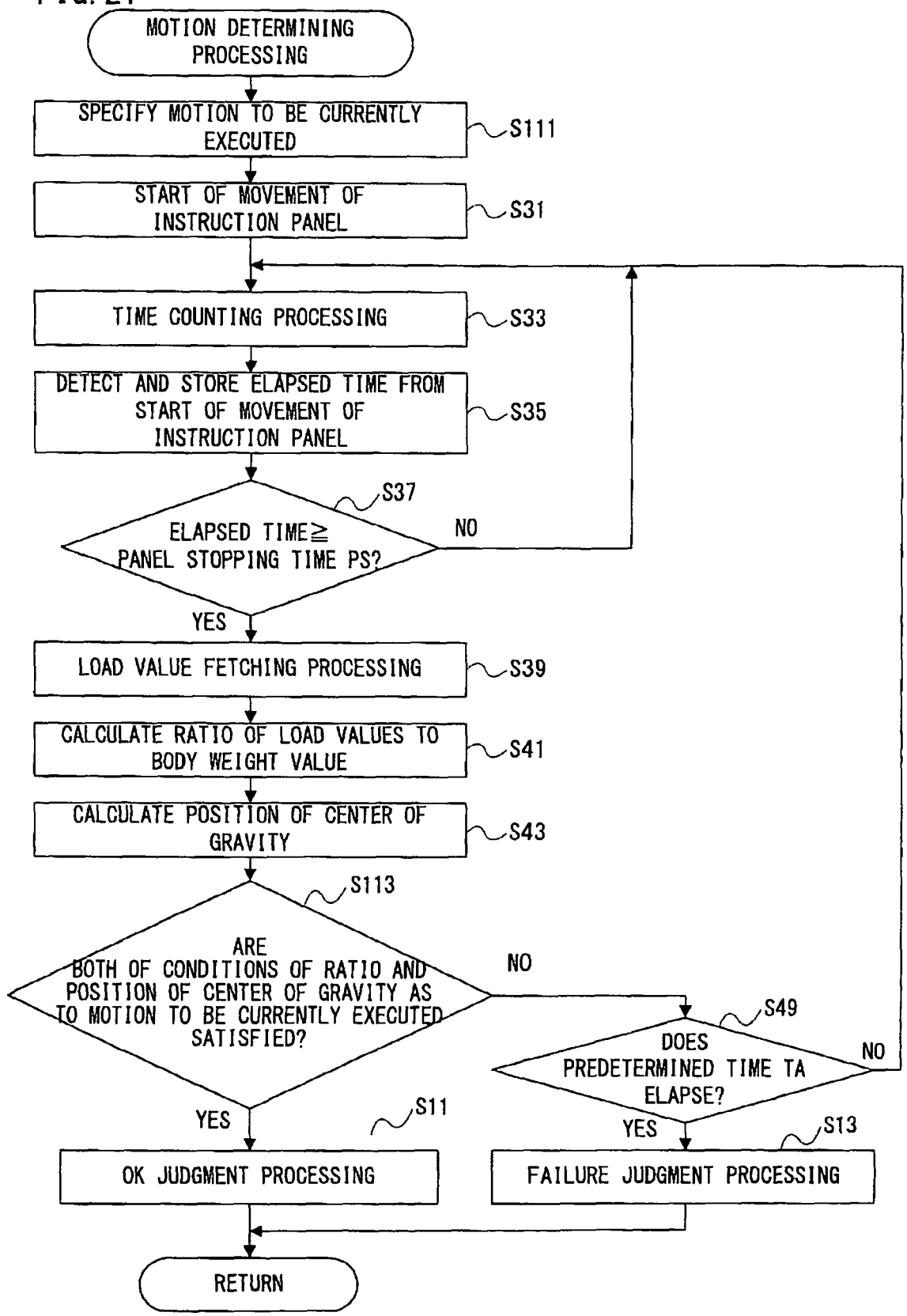
FIG. 21 is a flowchart showing one example of an operation of the motion determining processing shown in FIG. 20.

FIG. 20 shows an operation of the CPU 40 of the game apparatus 12 in this case of the embodiment. The difference between FIG. 20 and FIG. 18 described above is points that the steps S9-S13 are deleted, and an operation in the motion determining processing in the step S7 is changed. The detail of the modified motion determining processing in a step S10 in FIG. 20 is shown in FIG. 21. Here, the respective judgment processing in the step S11 and S13 in FIG. 18 are included in the motion determining processing in the step S101. In FIG. 20 and FIG. 21, the same reference numerals are applied to the same processing as FIG. 18, so that the detailed description thereof is omitted here.

When starting motion determining processing in FIG. 21, in a step S111, the CPU 40 specifies a motion to be currently executed. A motion corresponding to a panel 400 positioned upwardly adjacent to the frame 402 is the motion to be currently executed. For example, as described above, the panel 400 positioned upwardly adjacent to the frame 402 is detected by checking the coordinate data of the adjacent position stored in advance and coordinate data indicating a current position of each panel 400, and the identification information of the motion corresponding to the detected panel 400 is detected and stored as identification information of the motion to be currently executed. In the movement processing started in the step S31, the movement of the plurality of panels 400 including the panel 400 indicating the motion to be currently executed is controlled as described above. As to the panel 400 instructing the motion to be currently executed, the panel 400 is controlled such that the panel 400 starts to move into the frame 402, stops within the frame 402 when the predetermined time PS elapses from the start of the movement, and continues to stop within the frame 402 until the predetermined time TA elapses from the start of the movement.

In the step S41, a ratio of the load values to the body weight value is calculated, and in the step S43, a position of the center of gravity is calculated. Then, the CPU 40 decides whether or not the condition of the ratio and the condition of the position of the center of gravity as to the motion to be currently executed are satisfied in a step 113. More specifically, since the identification information on the motion to be currently executed has been detected in the step S111, the condition of the ratio and the condition of the position of the center of gravity corresponding to the identification information are read from the motion identifying condition table. Then, it is decided whether or not the ratio calculated in the step S41 satisfies the read condition of the ratio, and whether or not the position of the center of gravity calculated in the step S43 satisfies the read condition of the position of the center of gravity.

If "YES" in the step S113, that is, if it is decided that the motion to be currently executed is executed by the player, CPU 40 executes an OK judgment processing in the step S11. Here, the OK judgment processing is similar to that in the step S11 shown in FIG. 18.

On the other hand, if "NO" in the step S113, that is, if it is not decided that the motion to be currently executed is executed by the player, the CPU 40 decides whether or not a predetermined time TA elapses from the start of the movement in the step S31 in the step S49. If "YES" in the step S49, that is, if the motion to be currently executed is not executed by the player after a lapse of the time limit TA, the CPU 40 executes failure judgment processing in the step S13. Here, the failure judgment processing is similar to that in the step S13 shown in FIG. 18. After completion of the step S11 or S13, the motion determining processing in FIG. 21 is ended, and the process returns to the step S15 in FIG. 20.

Additionally, in each of the embodiment in FIG. 20 and FIG. 21, as described above, load values are detected from when an instruction of a movement is performed to when a predetermined time (time limit TA, for example) elapses per unit of time (one frame, for example), and a motion may be determined on the basis of the detected load values for every unit of time. In this case, unlikely to the embodiment in FIG. 18 and FIG. 19 described above, whether or not a predetermined motion (instructed motion) is performed is determined, and therefore, as to an identification condition for each motion, it is possible to allow an overlapping with another motion, capable of broadly setting a condition in view of a habit, etc. of an individual, for example.

In addition, in each of the embodiment in FIG. 20 and FIG. 21, as described above, whether or not an OK judgment is performed on the past motion, that is, whether or not the player properly performed the motion in the past as well as both of the conditions of the ratio and the position of the center of gravity can further be decided. More specifically, if "YES" in the step S113, with reference to the game result data as to the past motion, whether or not the evaluation data indicating the OK judgment is stored may be decided, and if "YES" here, the OK judgment processing in the step S11 is performed, and if "NO", the failure judgment processing in the step S13 is performed. The condition, such as motion as a judgment object and the necessary number of OK judgments, etc. can be set as necessary as described above. For example, as to a motion at the fourth step in the step-up-and-down exercise, at the judgment timing of the motion at the fourth step, it is determined that both of the feet are put down on the basis of the condition of the ratio. Thus, by further deciding whether or not the motions at the first-third steps in the past are performed, it is possible to prevent the score from being given to the player in spite of the fact that the player has never put on the load controller 36.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium storing a load detecting program to be executed in a computer of a load detecting apparatus provided with a support board which has two or more load sensors spaced with each other, and on which a player puts his or her foot, said load detecting program causes said computer to execute instructions comprising:

detecting load values put on said support board measured by said two or more load sensors;

calculating a ratio of said detected load values to a body weight value of said player;

calculating a position of the center of gravity based on said detected load values, and determining a motion performed on said support board by said player on the basis of said ratio and said position of the center of gravity.

2. The non-transitory computer readable storage medium storing the load detecting program according to claim 1, wherein whether or not a predetermined motion is performed on the basis of said ratio and said position of the center of gravity is determined.

3. The non-transitory computer readable storage medium storing the load detecting program according to claim 2, wherein said predetermined motion in a past is performed in a past as a determination condition.

4. The non-transitory computer readable storage medium storing the load detecting program according to claim 2, wherein said load detecting program causes said computer to further execute instructions comprising:
   instructing said player to perform any one motion out of a plurality of motions as said predetermined motion, and counting an elapsed time from when an instruction is given, wherein
   whether or not the motion instructed is performed while said elapsed time falls within a predetermined time is determined.

5. The non-transitory computer readable storage medium storing the load detecting program according to claim 1, wherein which motion is performed out of a plurality of motions set in advance on the basis of said ratio and said position of the center of gravity is specified.

6. The non-transitory computer readable storage medium storing the load detecting program according to claim 1, wherein said position of center of gravity in a right direction and a left direction is calculated based on a difference between load values at a right of a player and load values at a left of the player, and said position of center of gravity in a back and forth direction is calculated based on a difference between load values in a front of the player and load values in a rear of the player.

7. A load detecting apparatus provided with a support board which has two or more load sensors spaced with each other, and on which a player puts his or her foot, comprising:
   a load value detecting unit for detecting load values put on said support board measured by said two or more load sensors;
   a ratio calculating unit for calculating a ratio of said load values detected by said load detecting unit to a body weight value of said player;
   a position of the center of gravity calculating unit for calculating a position of the center of gravity based on said load values detected by said load detecting unit, and
   a motion determining unit for determining, via one or more processors, a motion performed on said support board by said player on the basis of said ratio and said position of the center of gravity.

8. A load detecting system comprising:
   a load detecting apparatus comprising:
      a support board having two or more load sensors spaced with each other, the support board configured to allow a player to put his/her foot on the support board;
      a data transmission device for transmitting data from the load detecting apparatus; and
      a processing device comprising:
         a load value detecting unit for detecting load values put on said support board measured by said two or more load sensors;
         a ratio calculating unit for calculating a ratio of said load values detected by said load detecting unit to a body weight value of said player;
         a position of the center of gravity calculating unit for calculating a position of the center of gravity based on said load values detected by said load detecting unit, and
         a motion determining unit for determining a motion performed on said support board by said player on the basis of said ratio and said position of the center of gravity.

9. A method for processing load values, via one or more processors, using a load detecting apparatus having a support board which has two or more load sensors spaced with each other, and on which a player puts his or her foot, the method comprising:
   detecting load values put on said support board measured by said two or more load sensors;
   calculating a ratio of said detected load values to a body weight value of said player;
   calculating a position of the center of gravity based on said detected load values; and
   determining a motion performed on said support board by said player on the basis of said ratio and said position of the center of gravity.

\* \* \* \* \*